(12) United States Patent
Liao

(10) Patent No.: US 10,788,648 B2
(45) Date of Patent: Sep. 29, 2020

(54) OPTICAL IMAGING LENS, IMAGING DEVICE, AND ELECTRONIC DEVICE HAVING THE SAME

(71) Applicant: ZHONG YANG TECHNOLOGY CO., LTD., Taichung (TW)

(72) Inventor: Chen-Cheng Liao, Taichung (TW)

(73) Assignee: ZHONG YANG TECHNOLOGY CO., LTD., Taichung (TW)

( * ) Notice: Subject to any disclaimer, the term of this patent is extended or adjusted under 35 U.S.C. 154(b) by 117 days.

(21) Appl. No.: 16/273,159

(22) Filed: Feb. 12, 2019

(65) Prior Publication Data
US 2020/0192061 A1    Jun. 18, 2020

(30) Foreign Application Priority Data
Dec. 17, 2018  (TW) .............................. 107145416 A

(51) Int. Cl.
| G02B 9/60 | (2006.01) |
| G02B 27/00 | (2006.01) |
| G02B 7/02 | (2006.01) |
| G02B 13/18 | (2006.01) |
| G02B 5/00 | (2006.01) |
| G02B 13/00 | (2006.01) |
| G02B 13/04 | (2006.01) |

(52) U.S. Cl.
CPC .............. *G02B 9/60* (2013.01); *G02B 7/021* (2013.01); *G02B 27/0025* (2013.01); *G02B 5/005* (2013.01); *G02B 13/0045* (2013.01); *G02B 13/04* (2013.01); *G02B 13/18* (2013.01)

(58) Field of Classification Search
CPC .. G02B 13/0045; G02B 9/60; G02B 27/0025; G02B 13/18; G02B 5/005; G02B 13/04; G02B 7/021
USPC ................................ 359/714, 740, 763, 770
See application file for complete search history.

(56) References Cited

U.S. PATENT DOCUMENTS

| 9,191,561 | B2 * | 11/2015 | Lin | ........................ | H04N 5/2254 |
| 10,247,911 | B2 * | 4/2019 | Chen | ........................ | G02B 9/60 |
| 2014/0184845 | A1 * | 7/2014 | Nakayama | .............. | G02B 13/04 |
| | | | | | 359/740 |
| 2015/0103244 | A1 * | 4/2015 | Lin | ........................... | G02B 9/60 |
| | | | | | 359/763 |
| 2016/0097915 | A1 * | 4/2016 | Chung | ............... | G02B 13/0045 |
| | | | | | 359/714 |

\* cited by examiner

*Primary Examiner* — Evelyn A Lester
(74) *Attorney, Agent, or Firm* — Winston Hsu

(57) ABSTRACT

An optical imaging lens assembly, an imaging device and an electronic device having the same are provided. The optical imaging lens assembly includes, in order from an object side to an image side, a first lens with negative refractive power including an object-side surface being convex and an image-side surface being concave, an aperture stop, a second lens with positive refractive power including an object-side surface being concave and an image-side surface being convex, a third lens with negative refractive power including an object-side surface being convex and an image-side surface being concave, a fourth lens with positive refractive power including an image-side surface being convex, and a fifth lens with negative refractive power including an image-side surface being concave. The optical imaging lens assembly satisfies a specific condition so as to favorably provide wide-angle images while keeping a miniature size.

10 Claims, 18 Drawing Sheets

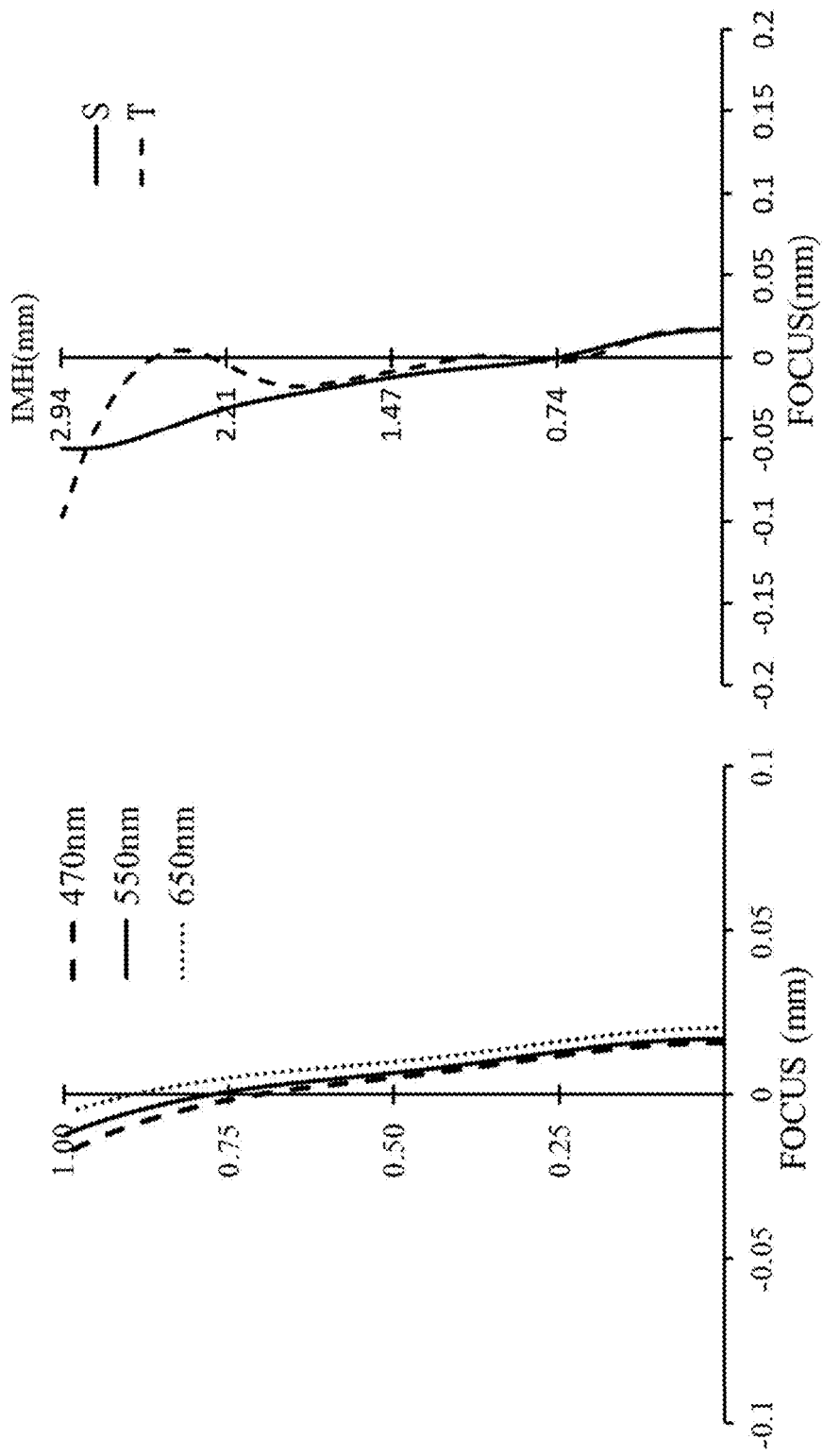

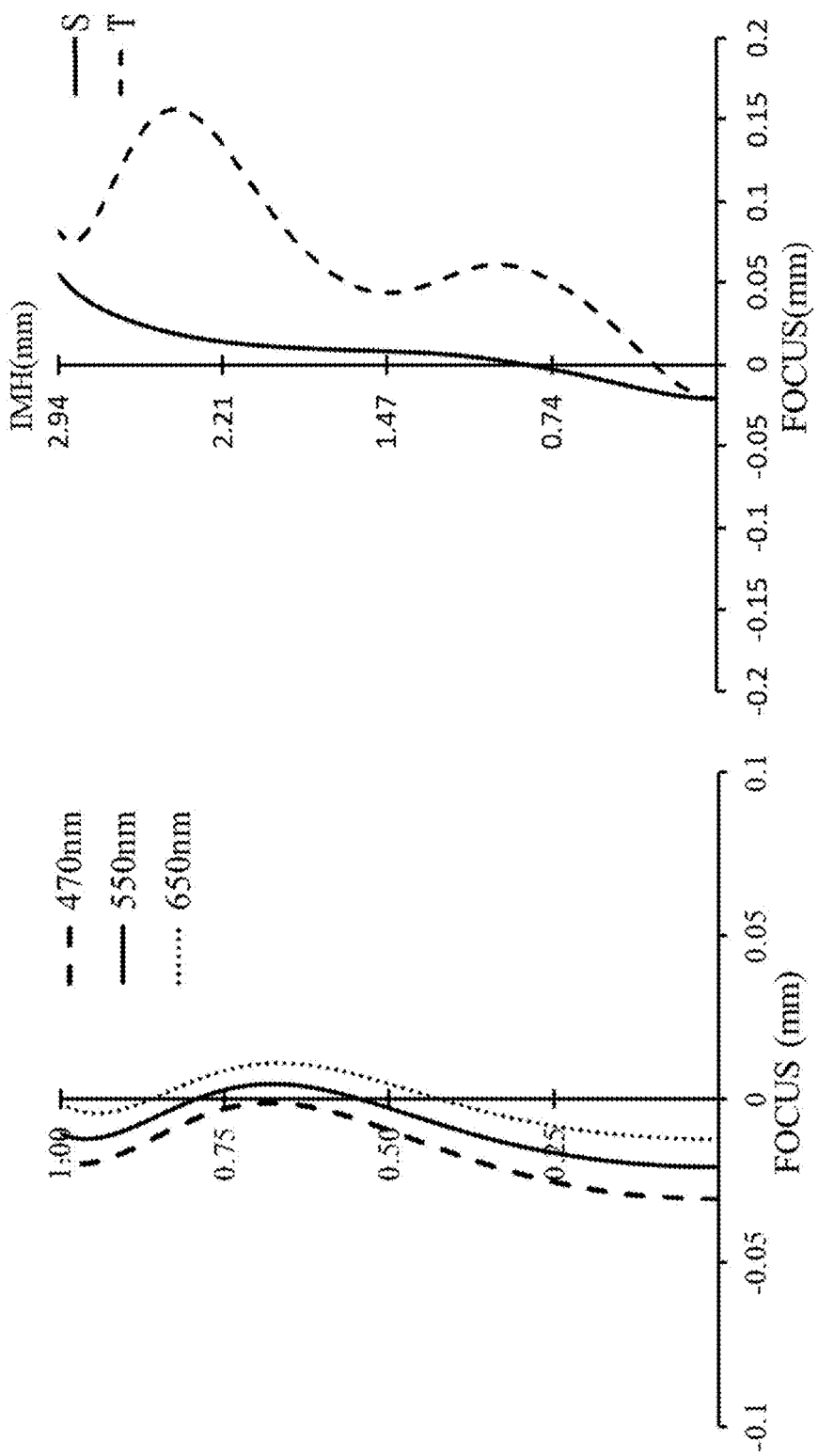

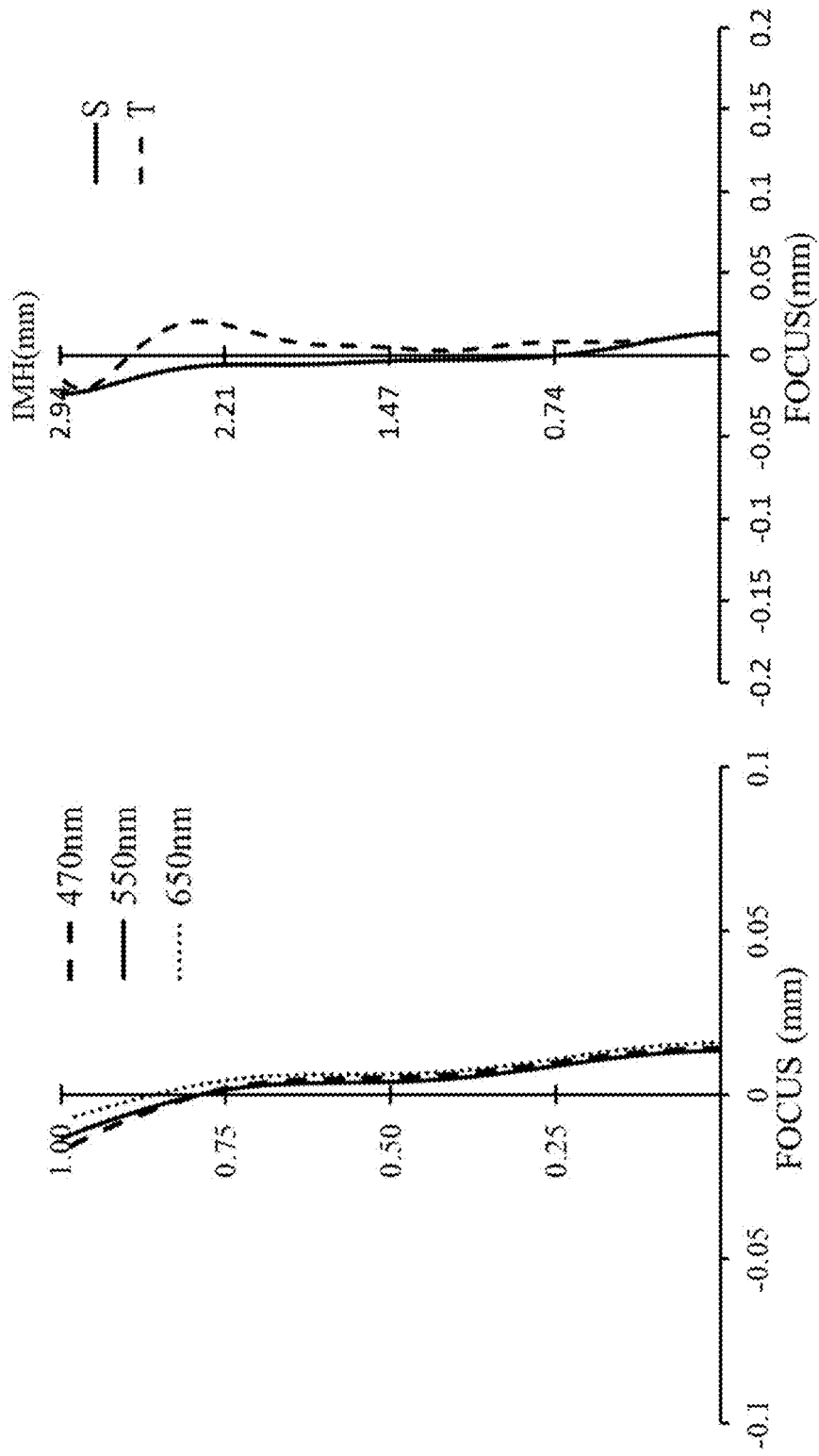

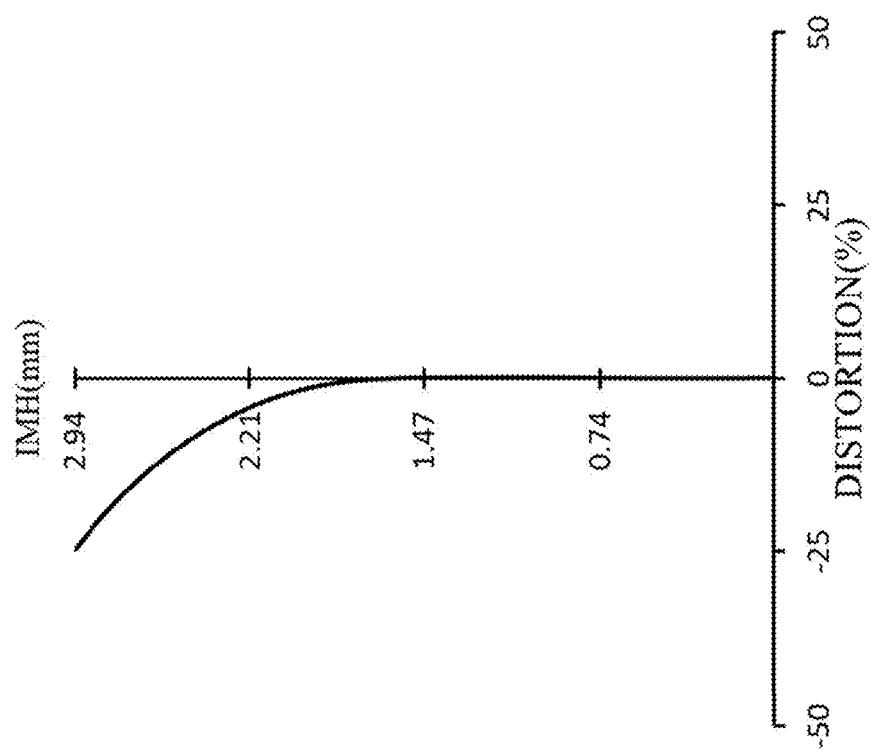

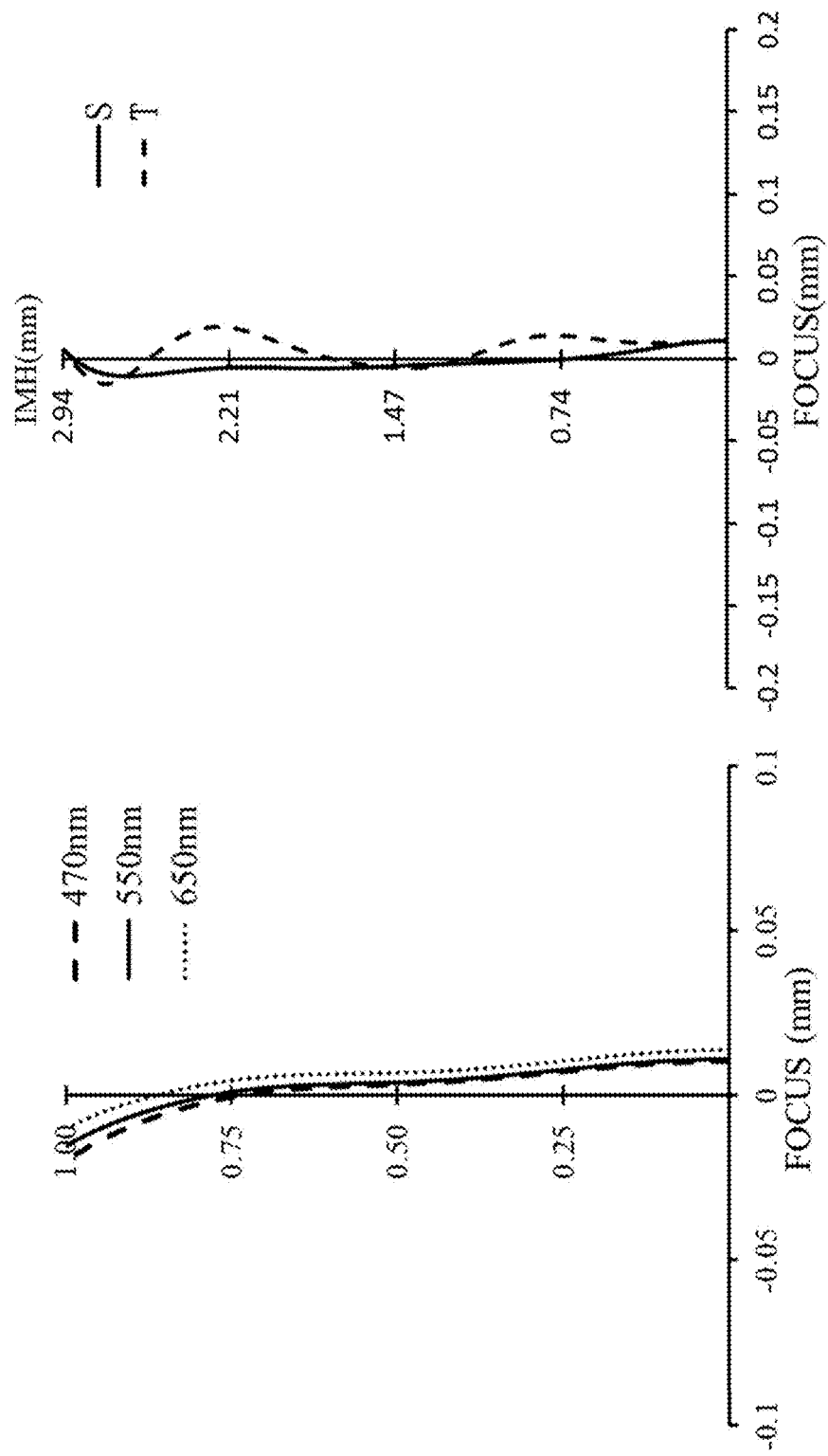

OPTICAL IMAGING LENS, IMAGING DEVICE, AND ELECTRONIC DEVICE HAVING THE SAME

CROSS REFERENCE TO RELATED APPLICATION

This non-provisional application claims priority under 35 U.S.C. § 119(a) on Taiwanese Patent Application No. 107145416 filed in Taiwan, R.O.C., on Dec. 17, 2018, the disclosure of which is hereby incorporated by reference in its entirety.

BACKGROUND OF THE INVENTION

1. Field of the Invention

The present disclosure is related to an optical imaging device, and more particularly, to an optical imaging lens assembly applicable to a portable electronic device, a surveillance system, or a vehicle imaging device, and an imaging device and an electronic device having the optical imaging lens assembly.

2. Description of the Prior Art

With the advancement of semiconductor manufacturing technology, the dimension of image sensors (such as CCD and CMOS Image Sensor) could be reduced to meet the size requirements of miniaturized photographing devices, which drives consumer electronic products to be equipped with miniaturized cameras to increase their added values. Taking portable electronic devices such as smartphones as an example, because of its convenience and portability, today's consumers often use smartphones to take pictures instead of traditional digital cameras. However, consumers' expectation of portable electronic devices keeps on growing. In addition to having a sophisticated look, the portable electronic devices also have to be compact and light-weight. Therefore, this trend has made it necessary for the miniaturized cameras mounted on the portable electronic devices to be further miniaturized in its volume so as to be accommodated in an electronic product that is thin and compact in appearance.

Furthermore, consumers also demand an increased imaging quality of miniaturized cameras. In addition to providing a sharp image, it is also expected to have a wide field of view to meet different application needs for various situations. However, the increasing field of view of a small-sized imaging device often results in an increase in the total track length of the optical lens assembly and the difficulties in correcting aberrations. Hence, a further need exists for a miniaturized camera which could provide good image quality and a wide field of view.

SUMMARY OF THE INVENTION

Therefore, the present disclosure provides an optical imaging lens assembly, in order from an object side to an image side, including a first lens, an aperture stop, a second lens, a third lens, a fourth lens, and a fifth lens. The first lens with negative refractive power has an object-side surface being convex and an image-side surface being concave. The second lens with positive refractive power has an object-side surface being concave and an image-side surface being convex. The third lens with negative refractive power has an object-side surface being convex and an image-side surface being concave. The fourth lens with positive refractive power has an object-side surface and an image-side surface, wherein the image-side surface of the fourth lens is convex. The fifth lens with negative refractive power has an object-side surface and an image-side surface, wherein a paraxial region of the image-side surface of the fifth lens is concave and an off-axis region of the image-side surface of the fifth lens is convex. The optical imaging lens assembly satisfies the following conditions:

$0.1 < CT1/(AT1+CT2) < 0.3$; and $0.8 < |f2/f| < 1.4$;

wherein, CT1 is a thickness of the first lens along an optical axis; CT2 is a thickness of the second lens along the optical axis; AT1 is a distance between the image-side surface of the first lens and the object-side surface of the second lens along the optical axis; f is an effective focal length of the optical imaging lens assembly; f2 is a focal length of the second lens.

According to an embodiment of the present disclosure, a distance between the image-side surface of the second lens and the object-side surface of the third lens is AT2; a distance between the image-side surface of the third lens and the object-side surface of the fourth lens is AT3; a distance between the image-side surface of the fourth lens and the object-side surface of the fifth lens is AT4; the optical imaging lens assembly satisfies the following condition:

$0.6 < (AT2+AT3)/AT4 < 2.8$.

According to an embodiment of the present disclosure, a total track length of the optical imaging lens assembly is TTL; a maximum image height of the optical imaging lens assembly is IMH; the optical imaging lens assembly satisfies the following condition:

$1.3 < TTL/IMH < 1.9$.

According to an embodiment of the present disclosure, a focal length of the third lens is f3 and the optical imaging lens assembly satisfies the following condition:

$0.25 < |f2/f3| < 0.6$.

According to an embodiment of the present disclosure, the Abbe number of the third lens is V3 and the Abbe number of the fifth lens is V5; the optical imaging lens assembly satisfies the following condition:

$0.7 < V3/V5 < 1.2$.

According to an embodiment of the present disclosure, half of the maximum field of view is HFOV and the optical imaging lens assembly satisfies the following condition:

45 degrees $< HFOV <$ 70 degrees.

According to an embodiment of the present disclosure, a paraxial region of the object-side surface of the third lens is convex, and an off-axis region of the object-side surface of the third lens is concave.

According to an embodiment of the present disclosure, the object-side surface of the fifth lens is convex.

The present disclosure further provides an imaging device including the optical imaging lens assembly as mentioned above and an electronic image sensor.

In addition, the present disclosure provides an electronic device including the imaging device as mentioned above.

BRIEF DESCRIPTION OF THE DRAWINGS

The present disclosure will be described hereinafter with reference to the appended drawings. It is to be noted that all the drawings are shown for the purpose of illustrating the technical concept of the present disclosure or embodiments thereof, in which:

FIG. 2B shows the longitudinal spherical aberration curves of the optical imaging lens assembly according to the second embodiment;

FIG. 2C shows the astigmatism field curves of the optical imaging lens assembly according to the second embodiment;

FIG. 3B shows the longitudinal spherical aberration curves of the optical imaging lens assembly according to the third embodiment;

FIG. 3C shows the astigmatism field curves of the optical imaging lens assembly according to the third embodiment;

FIG. 5B shows the longitudinal spherical aberration curves of the optical imaging lens assembly according to the fifth embodiment;

FIG. 5C shows the astigmatism field curves of the optical imaging lens assembly according to the fifth embodiment;

FIG. 5D shows the distortion curves of the optical imaging lens assembly according to the fifth embodiment;

FIG. 6B shows the longitudinal spherical aberration curves of the optical imaging lens assembly according to the sixth embodiment;

FIG. 6C shows the astigmatism field curves of the optical imaging lens assembly according to the sixth embodiment.

DETAILED DESCRIPTION

Figure 1A:
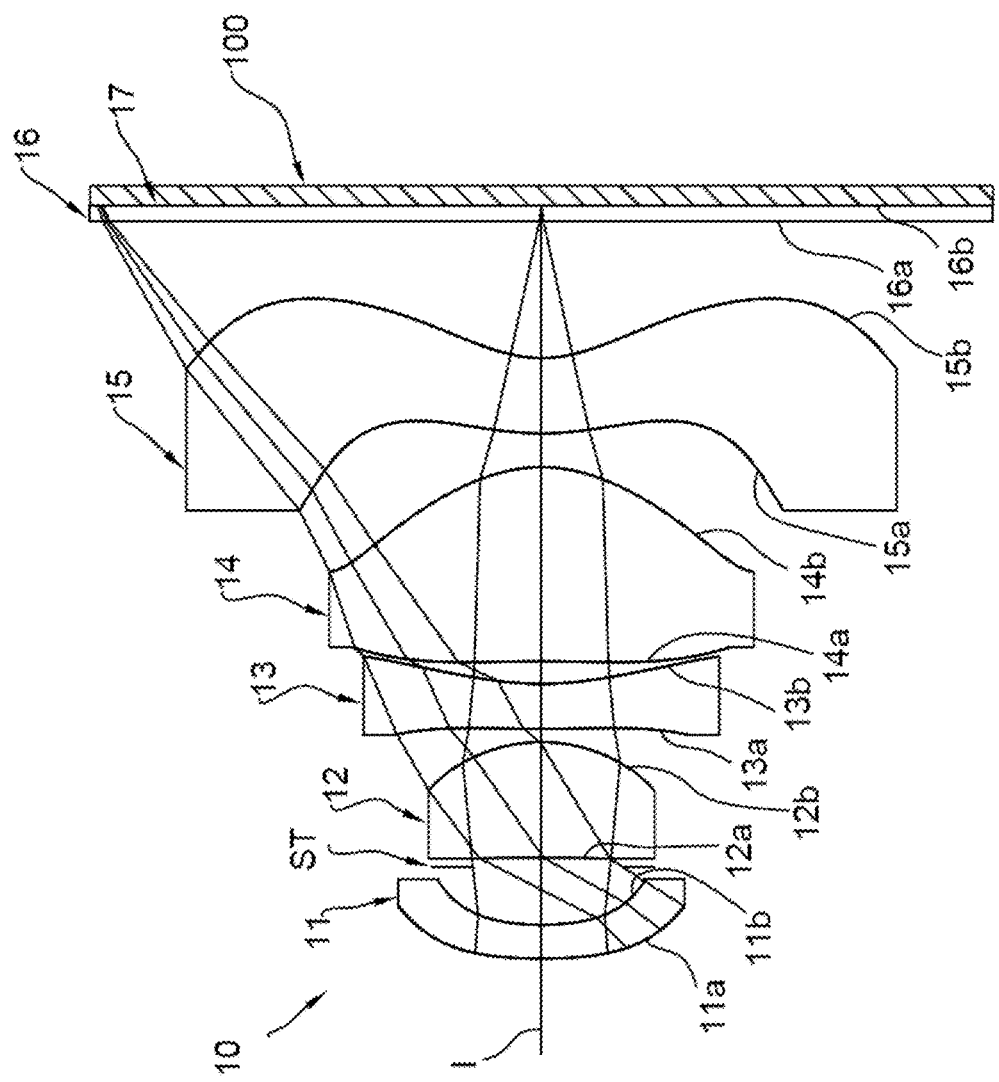
FIG. 1A is a schematic view of an optical imaging lens assembly according to a first embodiment of the present disclosure.

An optical imaging lens assembly of the present disclosure includes, in order from an object side to an image side, a first lens, an aperture stop, a second lens, a third lens, a fourth lens, and a fifth lens.

According to the embodiments of the present disclosure, each lens of the optical imaging lens assembly includes an object-side surface facing an imaged object, and an image-side surface facing an image plane. Each of the object-side and image-side surfaces includes a surface area near an optical axis (a paraxial region) and a surface area away from the optical axis (an off-axis region). In the following description, if it is not explicitly indicated a surface area of the lens surface, a lens surface is defined as being convex or concave based on the surface shape of a paraxial region thereof.

According to the embodiments of the present disclosure, the first lens has negative refractive power and includes an object-side surface being convex and an image-side surface being concave. Whereby, it is favorable to receive incident rays of a wider angle, which increases the light-receiving range of the optical imaging lens assembly.

The second lens has positive refractive power and includes an object-side surface being concave and an image-side surface being convex.

The aperture stop is placed between the first lens and the second lens to reduce stray light.

The optical imaging lens assembly satisfies the following condition:

$$0.1 < CT1/(AT1+CT2) < 0.3;$$

wherein, CT1 is a thickness of the first lens along the optical axis, CT2 is a thickness of the second lens along the optical axis, and AT1 is a distance between the image-side surface of the first lens and the object-side surface of the second lens along the optical axis. With the first lens having negative refractive power, the second lens having positive refractive power and the aforementioned arrangement, it could correct aberration and reduce a total track length of the optical imaging lens assembly.

The optical imaging lens assembly further satisfies the following condition:

$$0.8 < |f2/f| < 1.4;$$

wherein, f is an effective focal length of the optical imaging lens assembly, and f2 is a focal length of the second lens. By controlling a ratio of the focal length of the second lens to the effective focal length of the optical imaging lens assembly appropriately, it is favorable to reduce the total track length of the optical imaging lens assembly and correct aberration.

The third lens has negative refractive power and includes an object-side surface being convex and an image-side surface being concave. Preferably, a paraxial region of the object-side surface of the third lens is convex, and an off-axis region of the object-side surface of the third lens is concave.

The fourth lens has positive refractive power and includes an image-side surface being convex. Preferably, a paraxial region of the image-side surface of the fourth lens is convex, and an off-axis region of the image-side surface of the fourth lens is concave.

The fifth lens has negative refractive power and includes an image-side surface being concave. Preferably, a paraxial region of an object-side surface of the fifth lens is convex, and an off-axis region of the object-side surface of the fifth lens is concave; a paraxial region of the image-side surface of the fifth lens is concave, and an off-axis region of the image-side surface of the fifth lens is convex.

Furthermore, the optical imaging lens assembly satisfies the following condition:

$$0.6<(AT2+AT3)/AT4<2.8;$$

wherein, AT2 is a distance between the image-side surface of the second lens and the object-side surface of the third lens along the optical axis, AT3 is a distance between the image-side surface of the third lens and the object-side surface of the fourth lens along the optical axis, and AT4 is a distance between the image-side surface of the fourth lens and the object-side surface of the fifth lens along the optical axis. Whereby, it could effectively correct coma and astigmatism aberration.

The optical imaging lens assembly further satisfies the following condition:

$$1.3<TTL/IMH<1.9;$$

wherein, IMH is a maximum image height of the optical imaging lens assembly, and TTL is the total track length of the optical imaging lens assembly.

The optical imaging lens assembly further satisfies the following condition:

$$0.25<|f2/f3|<0.6;$$

wherein, f3 is a focal length of the third lens. When f2 and f3 satisfy the above condition, it is favorable to reduce the total track length of the optical imaging lens assembly and correct aberration.

The optical imaging lens assembly further satisfies the following condition:

$$0.7<V3/V5<1.2;$$

wherein, V3 is the Abbe number of the third lens, and V5 is the Abbe number of the fifth lens. When the above condition is satisfied, it could effectively correct chromatic aberration of the optical imaging lens assembly.

Furthermore, half of the maximum field of view of the optical imaging lens assembly is HFOV, and it satisfies the following condition:

45 degrees<HFOV<70 degrees.

First Embodiment

Figures 1B, 1C:
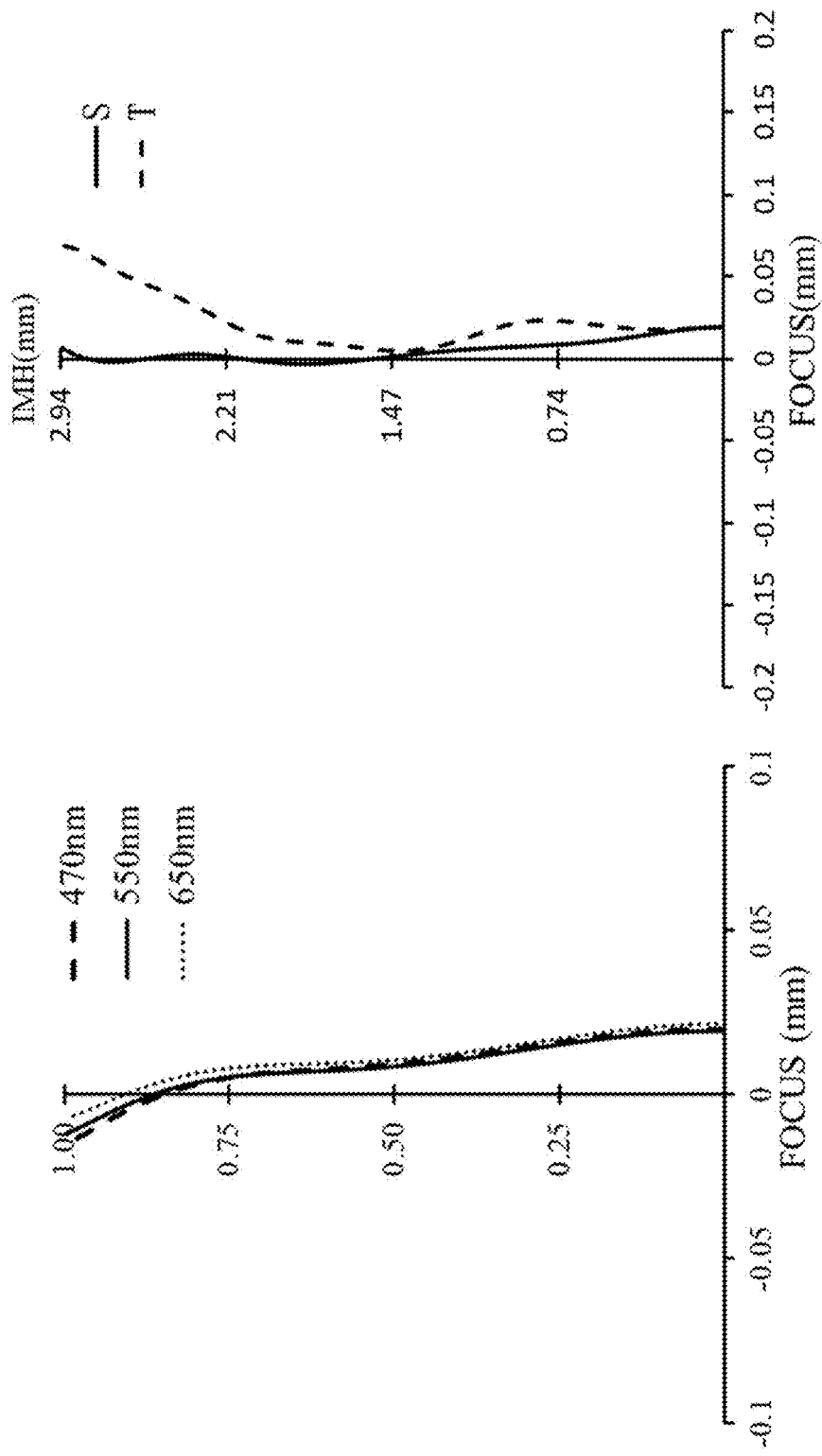
FIG. 1B shows the longitudinal spherical aberration curves of the optical imaging lens assembly according to the first embodiment.
FIG. 1C shows the astigmatism field curves of the optical imaging lens assembly according to the first embodiment.
Figure 1D:
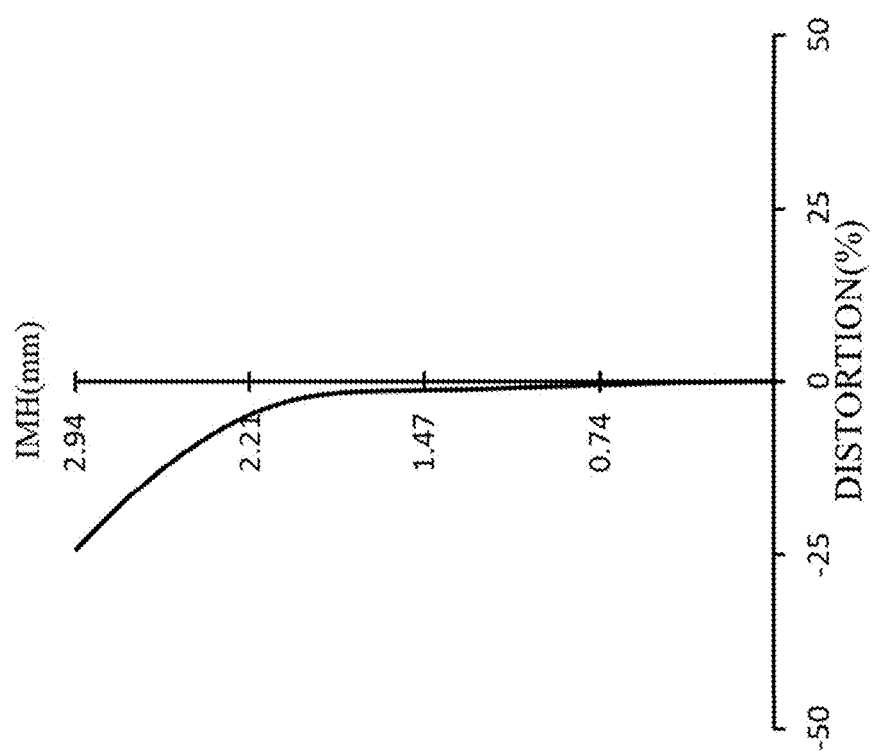
FIG. 1D shows the distortion curves of the optical imaging lens assembly according to the first embodiment.

FIG. 1A is a schematic view of an optical imaging lens assembly of a first embodiment according to the present disclosure. FIG. 1B shows the longitudinal spherical aberration curves of the optical imaging lens assembly according to the first embodiment. FIG. 1C shows astigmatism field curves of the optical imaging lens assembly according to the first embodiment. FIG. 1D shows the distortion curves of the optical imaging lens assembly according to the first embodiment.

As shown in FIG. 1A, the optical imaging lens assembly 10 of the first embodiment includes, in order from an object side to an image side, a first lens 11, an aperture stop ST, a second lens 12, a third lens 13, a fourth lens 14, a fifth lens 15, a filter unit 16 and an image plane 17. Wherein, the object side is adjacent to an imaged object, and the image side is adjacent to the image plane 17. In addition, an electronic image sensor 100 could be disposed on the image plane 17 of the optical imaging lens assembly 10 to form an imaging device (not labeled).

The first lens 11 has negative refractive power and is made of plastic material. The first lens 11 includes an object-side surface 11a being convex and an image-side surface 11b being concave, wherein both of the object-side surface 11a and the image-side surface 11b are aspheric.

The second lens 12 has positive refractive power and is made of plastic material. The second lens 12 includes an object-side surface 12a being concave and an image-side surface 12b being convex, wherein both of the object-side surface 12a and the image-side surface 12b are aspheric.

The third lens 13 has negative refractive power and is made of plastic material. The third lens 13 includes an object-side surface 13a and an image-side surface 13b which are both aspheric, wherein a paraxial region of the object-side surface 13a is convex, and an off-axis region of the object-side surface 13a is concave; the image-side surface 13b is concave.

The fourth lens 14 has positive refractive power and is made of plastic material. The fourth lens 14 includes an object-side surface 14a and an image-side surface 14b which are both aspheric, wherein a paraxial region of the image-side surface 14b is convex and an off-axis region of the image-side surface 14b is concave.

The fifth lens 15 has negative refractive power and is made of plastic material. The fifth lens 15 includes an object-side surface 15a and an image-side surface 15b which are both aspheric, wherein a paraxial region of the object-side surface 15a is convex and an off-axis region of the object-side surface 15a is concave; a paraxial region of the image-side surface 15b is concave and an off-axis region of the image-side surface 15b is convex.

The filter unit 16 is placed between the fifth lens 15 and the image plane 17 and is made of glass. Both sides of the filter unit 16 are flat surfaces 16a, 16b. The filter unit 16 could be, for example, an IR-cut filter.

The aspherical shapes of the above lens surfaces are expressed by the following equation (1):

$$X(Y) = \frac{Y^2}{R} \bigg/ \left(1 + \sqrt{1-(1+K)\frac{Y^2}{R^2}}\right) + \sum_{i=1}^{n} A_i \times Y^i \quad (1)$$

wherein,

X: the displacement of a point on the aspheric lens surface at a distance Y from the optical axis relative to the tangential plane at the aspheric surface vertex;

Y: the distance from the point on the curve of the aspheric surface to the optical axis;

R: the radius of curvature of the aspherical lens surface at the paraxial region thereof;

k: the conic coefficient; and

Ai: the aspheric surface coefficient of order i.

In the first embodiment, the optical imaging lens assembly 10 satisfies the following conditions: f=2.1 mm, Fno=2.2, TTL=5.01 mm, HFOV=61.65 degrees, and IMH=2.934 mm, wherein f is an effective focal length, Fno is f-number, TTL is the total track length, and HFOV is half of the maximum field of view of the optical imaging lens assembly 10, respectively.

The optical imaging lens assembly 10 further satisfies the following condition: CT1/(AT1+CT2)=0.184, wherein CT1 is a thickness of the first lens 11 along the optical axis; CT2 is a thickness of the second lens 12 along the optical axis; AT1 is a distance between the image-side surface 11b of the first lens 11 and the object-side surface 12a of the second lens 12 along the optical axis.

The relation between a focal length f2 of the second length 12 and the effective focal length f of the optical imaging lens assembly 10 satisfies the following condition: |f2/f|=0.927.

The optical imaging lens assembly 10 further satisfies the following condition: (AT2+AT3)/AT4=1.055, wherein AT2 is the distance between the image-side surface 12b of the second lens 12 and the object-side surface 13a of the third lens 13 along the optical axis; AT3 is the distance between the image-side surface 13b of the third lens 13 and the object-side surface 14a of the fourth lens 14 along the optical axis; AT4 is the distance between the image-side surface 14b of the fourth lens 14 and the object-side surface 15a of the fifth lens 15.

A total track length TTL and a maximum image height IMH of the optical imaging lens assembly 10 satisfy the following condition: TTL/IMH=1.708.

The relation of the focal length f2 of the second lens 12 and a focal length f3 of the third lens 13 satisfies the following condition: |f2/f3|=0.441.

The Abbe number of the third lens is V3, and the Abbe number of the fifth lens is V5, and they satisfy the following condition: V3/V5=0.915.

Referring to Table 1, which provides the optical parameters of the optical imaging lens assembly 10 of the first embodiment. In Table 1, each surface number is referred to one of the lens surfaces, such as the object-side surface 11a of the first lens 11 is denoted as surface 11a; the image-side surface 11b is denoted as surface 11b, and so on. The symbol "ASP" followed a lens surface is used to describe that the lens surface is aspheric, for example, the lens surface 11a is an aspheric surface. The value in the distance column denotes a distance from a lens surface to a next lens surface. For example, the distance from the object-side surface 11a to the image-side surface 11b is 0.224 mm, which means that a thickness of the first lens 11 is 0.224 mm. Similarly, the distance from the image-side surface 11b of the first lens 11 to the aperture stop ST is 0.434 mm; the distance from the image-side surface 12b of the second lens 12 to the object-side surface 13a of the third lens 13 is 0.087 mm, and so on. In the following embodiments, the repetitive description would be omitted for brevity.

TABLE 1

First Embodiment
f = 2.1 mm, Fno = 2.2, TTL = 5.01 mm, HFOV = 61.65 degrees, IMH = 2.934 mm

|  | Surface | Curvature (1/mm) | | Distance (mm) | Refractive Index | Abbe Number | Focal length(mm) | Material |
|---|---|---|---|---|---|---|---|---|
| Object |  | Flat Surface |  | Infinity |  |  |  |  |
| 1st lens | 11a | 0.241 | ASP | 0.224 | 1.54 | 56.100 | −6.214 | Plastic |
|  | 11b | 0.548 | ASP | 0.434 |  |  |  |  |
| Aperture Stop | ST | 0 |  | 0.010 |  |  |  |  |
| $2^{nd}$ lens | 12a | −0.003 | ASP | 0.770 | 1.54 | 56.100 | 1.946 | Plastic |
|  | 12b | −0.947 | ASP | 0.087 |  |  |  |  |
| $3^{rd}$ lens | 13a | 0.153 | ASP | 0.300 | 1.65 | 21.500 | −4.417 | Plastic |
|  | 13b | 0.511 | ASP | 0.151 |  |  |  |  |
| $4^{th}$ lens | 14a | 0.078 | ASP | 1.290 | 1.54 | 56.100 | 1.944 | Plastic |
|  | 14b | −1.019 | ASP | 0.225 |  |  |  |  |
| $5^{th}$ lens | 15a | −0.321 | ASP | 0.500 | 1.64 | 23.500 | −2.664 | Plastic |
|  | 15b | 1.210 | ASP | 0.506 |  |  |  |  |
| Filter Unit | 16a | Flat Surface |  |  | 1.52 | 64.100 |  | Glass |
|  | 16b | Flat Surface |  |  |  |  |  |  |
| Image Plane |  | Flat Surface |  |  |  |  |  |  |

Table 2 below lists the values of the aspherical surface coefficients used in the above equation for each of the aspherical surfaces indicated in Table 1, wherein K is the conic coefficient; A2-A18 are the $2^{nd}$ order to the $18^{th}$ order aspheric coefficients, respectively. For example, the conic coefficient K of the object-side surface 11a of the first lens 11 is 7.6823, and so on. In the following description, the tables for each of the optical imaging lens assemblies of other embodiments use the same definition as the first embodiment. Therefore, the duplicated description would be omitted for brevity.

| First Embodiment__Aspherical Surface Coefficient | | | | | | |
|---|---|---|---|---|---|---|
| Surface | 11a | 11b | 12a | 12b | 13a | 13b |
| K | 7.6823E+00 | 4.6510E+00 | 4.8771E+01 | −2.4530E−01 | −2.2492E+01 | −4.6044E+00 |
| $A_2$ | 1.3000E−03 | 9.2400E−04 | −7.5900E−04 | 0.0000E+00 | 5.8600E−04 | 0.0000E+00 |
| $A_4$ | 3.4204E−01 | 5.0670E−01 | −7.9479E−02 | −7.5104E−02 | −2.8622E−01 | −1.6605E−01 |
| $A_6$ | −2.5368E−01 | −5.2135E−01 | −1.8986E−01 | 6.0104E−01 | 5.3373E−01 | 2.1660E−01 |
| $A_8$ | 2.9214E−01 | 1.0224E+00 | −4.8488E−01 | −2.2109E+00 | −8.2273E−01 | −1.7737E−01 |
| $A_{10}$ | −1.3748E+00 | 2.1237E+00 | 2.3689E+00 | 3.3180E+00 | 7.4665E−01 | 7.7200E−02 |
| $A_{12}$ | 5.1324E−02 | −8.5221E+00 | −3.3915E+00 | −2.1991E+00 | −2.9233E−01 | −4.4715E−03 |
| $A_{14}$ | 1.1604E−03 | 1.0352E+01 | −5.6097E+00 | −5.8444E−02 | −4.1866E−02 | −1.0375E−02 |
| $A_{16}$ | −2.3678E−02 | 0.0000E+00 | 0.0000E+00 | 0.0000E+00 | 4.7536E−02 | 2.5929E−03 |
| $A_{18}$ | 0.0000E+00 | 0.0000E+00 | 0.0000E+00 | 0.0000E+00 | 0.0000E+00 | 0.0000E+00 |

-continued

First Embodiment_Aspherical Surface Coefficient

| Surface | 14a | 14b | 15a | 15b |
|---|---|---|---|---|
| K | 3.9307E+01 | −1.5704E+00 | −4.8400E−01 | −2.9955E+00 |
| $A_2$ | −1.0670E−01 | 5.6700E−04 | 4.1551E−01 | 3.8000E−03 |
| $A_4$ | 1.9663E−01 | 9.9389E−02 | −1.8613E−01 | −1.5757E−01 |
| $A_6$ | −2.1631E−01 | −1.9899E−01 | −5.8617E−02 | 7.9360E−02 |
| $A_8$ | 1.9200E−01 | 2.1039E−01 | 1.0515E−01 | −2.7089E−02 |
| $A_{10}$ | −9.7572E−02 | −1.2228E−01 | −5.8831E−02 | 5.8403E−03 |
| $A_{12}$ | 1.9867E−02 | 3.0484E−02 | 1.1545E−02 | −8.1689E−04 |
| $A_{14}$ | 2.6763E−03 | 2.3380E−03 | −1.8916E−04 | 6.6477E−05 |
| $A_{16}$ | −1.3948E−03 | −1.4960E−03 | −5.0781E−05 | −2.2984E−06 |
| $A_{18}$ | 0.0000E+00 | 0.0000E+00 | 0.0000E+00 | 0.0000E+00 |

Second Embodiment

Figure 2A:
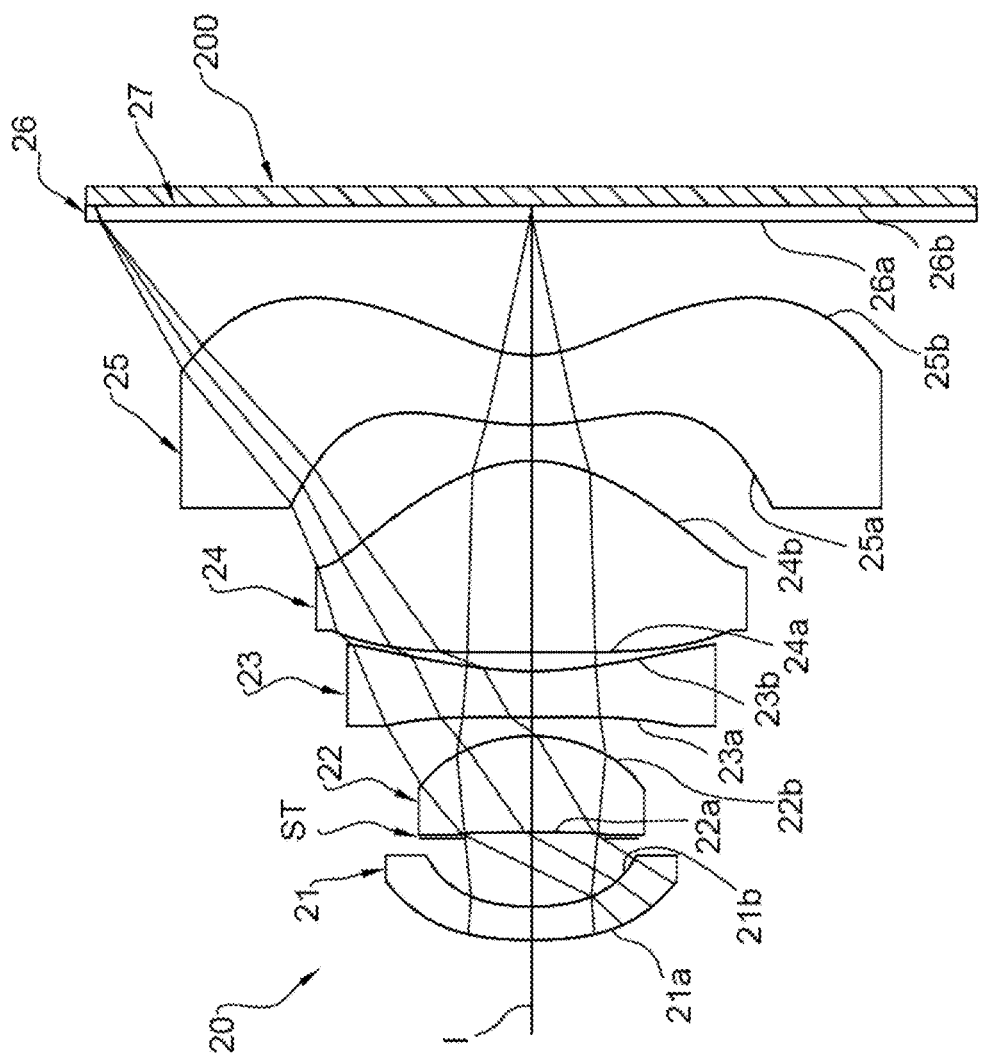
FIG. 2A is a schematic view of an optical imaging lens assembly according to a second embodiment of the present disclosure.
Figure 2D:
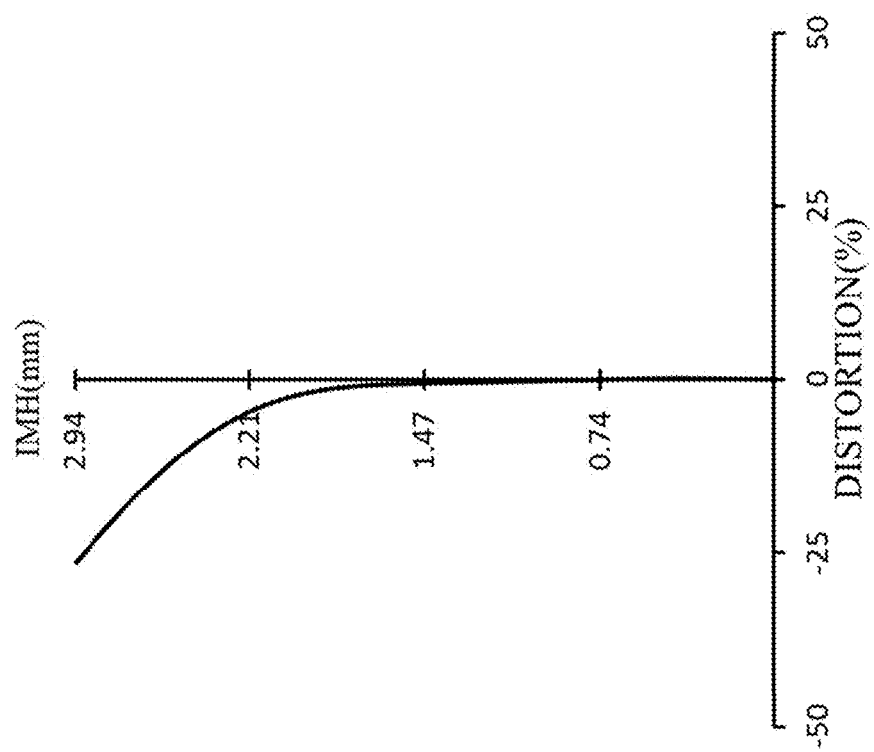
FIG. 2D shows the distortion curves of the optical imaging lens assembly according to the second embodiment.

FIG. 2A is a schematic view of an optical imaging lens assembly of a second embodiment according to the present disclosure. FIG. 2B shows the longitudinal spherical aberration curves of the optical imaging lens assembly according to the second embodiment. FIG. 2C shows the astigmatism field curves of the optical imaging lens assembly according to the second embodiment. FIG. 2D shows the distortion curves of the optical imaging lens assembly according to the second embodiment.

As shown in FIG. 2A, the optical imaging lens assembly 20 of the second embodiment includes, in order from an object side to an image side, a first lens 21, an aperture stop ST, a second lens 22, a third lens 23, a fourth lens 24, a fifth lens 25, a filter unit 26 and an image plane 27. Wherein, the object side is adjacent to an imaged object, and the image side is adjacent to the image plane 27. In addition, an electronic image sensor 200 could be disposed on the image plane 27 of the optical imaging lens assembly 20 to form an imaging device (not labeled).

The first lens 21 has negative refractive power and is made of plastic material. The first lens 21 includes an object-side surface 21a being convex and an image-side surface 21b being concave, wherein the object-side surface 21a and the image-side surface 21b are both aspheric.

The second lens 22 has positive refractive power and is made of plastic material. The second lens 22 includes an object-side surface 22a being concave and an image-side surface 22b being convex wherein the object-side surface 22a and the image-side surface 22b are both aspheric.

The third lens 23 has negative refractive power and is made of plastic material. The third lens 23 includes an object-side surface 23a and an image-side surface 23b which are both aspheric, wherein a paraxial region of the object-side surface 23a is convex, and an off-axis region of the object-side surface 23a is concave; the image-side surface 23b is concave.

The fourth lens 24 has positive refractive power and is made of plastic material. The fourth lens 24 includes an object-side surface 24a and an image-side surface 24b which are both aspheric, wherein a paraxial region of the image-side surface 24b is convex and an off-axis region of the image-side surface 24b is concave.

The fifth lens 25 has negative refractive power and is made of plastic material. The fifth lens 25 includes an object-side surface 25a and an image-side surface 25b which are both aspheric, wherein a paraxial region of the object-side surface 25a is convex and an off-axis region of the object-side surface 25a is concave; a paraxial region of the image-side surface 25b is concave and an off-axis region of the image-side surface 25b is convex.

The filter unit 26 is placed between the fifth lens 25 and the image plane 27 and is made of glass. Both sides of the filter unit 26 are flat surfaces 26a, 26b. The filter unit 16 could be, for example, an IR-cut filter.

The parameters for the optical imaging lens assembly 20 of the second embodiment have the same abbreviations as those parameters used in the first embodiment, such as f is an effective focal length; Fno is F-number; HFOV is half of the maximum field of view, and so on. The parameters for the optical imaging lens assembly 20 of the second embodiment are listed in Table 3.

TABLE 3

| | | | |
|---|---|---|---|
| f (mm) | 2.08 | CT1/(AT1 + CT2) | 0.195 |
| Fno | 2.4 | \|f2/f\| | 0.976 |
| TTL (mm) | 4.96 | (AT2 + AT3)/AT4 | 1.066 |
| Image Height (IMH) | 2.934 | TTL/IMH | 1.691 |
| HFOV (degree) | 62.6 | \|f2/f3\| | 0.476 |
| | | V3/V5 | 1 |

Then, referring to the following Table 4 and Table 5, wherein Table 4 shows the optical parameters of the optical imaging lens assembly according to the second embodiment of the present disclosure; Table 5 shows the aspherical surface coefficients for the aspherical lens surface in Table 4.

TABLE 4

Second Embodiment
f = 2.08 mm, Fno = 2.27, TTL = 4.96 mm, HFOV = 62.6 degrees, IMH = 2.934 mm

| | Surface | Curvature (1/mm) | | Distance (mm) | Refractive Index | Abbe Number | Focal length(mm) | Material |
|---|---|---|---|---|---|---|---|---|
| Object | | Flat Surface | | Infinity | | | | |
| 1st lens | 21a | 0.306 | ASP | 0.225 | 1.53 | 55.700 | −6.065 | Plastic |
| | 21b | 0.629 | ASP | 0.480 | | | | |

TABLE 4-continued

Second Embodiment
f = 2.08 mm, Fno = 2.27, TTL = 4.96 mm, HFOV = 62.6 degrees, IMH = 2.934 mm

|  | Surface | Curvature (1/mm) |  | Distance (mm) | Refractive Index | Abbe Number | Focal length(mm) | Material |
|---|---|---|---|---|---|---|---|---|
| Aperture Stop | ST | 0 |  | 0.023 |  |  |  |  |
| $2^{nd}$ lens | 22a | −0.064 | ASP | 0.649 | 1.54 | 56.100 | 2.031 | Plastic |
|  | 22b | −0.914 | ASP | 0.128 |  |  |  |  |
| $3^{rd}$ lens | 23a | 0.065 | ASP | 0.310 | 1.64 | 23.500 | −4.270 | Plastic |
|  | 23b | 0.435 | ASP | 0.130 |  |  |  |  |
| $4^{th}$ lens | 24a | 0.134 | ASP | 1.290 | 1.54 | 56.100 | 1.800 | Plastic |
|  | 24b | −1.055 | ASP | 0.242 |  |  |  |  |
| $5^{th}$ lens | 25a | 0.521 | ASP | 0.470 | 1.64 | 23.500 | −2.497 | Plastic |
|  | 25b | 2.424 | ASP | 0.546 |  |  |  |  |
| Filter Unit | 26a | Flat Surface |  |  | 1.52 | 64.100 |  | Glass |
|  | 26b | Flat Surface |  |  |  |  |  |  |
| Image Plane |  | Flat Surface |  |  |  |  |  |  |

TABLE 5

Second Embodiment_Aspherical Surface Coefficient

| Surface | 21a | 21b | 22a | 22b | 23a | 23b |
|---|---|---|---|---|---|---|
| K        | 8.7154E+00  | 2.6957E+00  | 1.3869E+01  | −5.9600E−02 | −2.1243E+01 | −3.5459E+00 |
| $A_2$    | 0.0000E+00  | 0.0000E+00  | 2.5450E−02  | 0.0000E+00  | 0.0000E+00  | 0.0000E+00  |
| $A_4$    | 3.6677E−01  | 5.2521E−01  | −1.4432E−01 | −1.1080E−01 | −2.7401E−01 | −1.6464E−01 |
| $A_6$    | −6.2139E−01 | −5.7636E−01 | −1.6393E−01 | 5.1933E−01  | 5.5822E−01  | 2.1897E−01  |
| $A_8$    | 1.6250E+00  | 9.9826E−01  | −2.3495E−01 | −2.0134E+00 | −8.2094E−01 | −1.7561E−01 |
| $A_{10}$ | −3.0038E+00 | 2.6841E+00  | −1.0938E+00 | 2.8587E+00  | 7.1628E−01  | 7.5979E−02  |
| $A_{12}$ | 3.5286E+00  | −8.3749E+00 | 0.0000E+00  | −1.5695E+00 | −3.0671E−01 | −6.2479E−03 |
| $A_{14}$ | −2.2795E+00 | 7.5533E+00  | 0.0000E+00  | −1.2017E+00 | −2.2596E−02 | −1.0053E−02 |
| $A_{16}$ | 5.7148E−01  | 0.0000E+00  | 0.0000E+00  | 0.0000E+00  | 5.6325E−02  | 3.2818E−03  |
| $A_{18}$ | 0.0000E+00  | 0.0000E+00  | 0.0000E+00  | 0.0000E+00  | 0.0000E+00  | 0.0000E+00  |

| Surface | 24a | 24b | 25a | 25b |
|---|---|---|---|---|
| K        | −6.8898E+01 | −1.7632E+00 | −8.1865E+00 | −1.3797E+00 |
| $A_2$    | −1.0062E−01 | 0.0000E+00  | −6.3624E−04 | −5.7889E−01 |
| $A_4$    | 1.8624E−01  | 8.4838E−02  | −8.6102E−02 | 2.2897E−02  |
| $A_6$    | −2.1329E−01 | −1.9518E−01 | −1.2766E−01 | 4.1925E−03  |
| $A_8$    | 1.9333E−01  | 2.1248E−01  | 1.4427E−01  | −2.6327E−03 |
| $A_{10}$ | −9.6177E−02 | −1.2403E−01 | −6.6760E−02 | 1.9705E−04  |
| $A_{12}$ | 1.9441E−02  | 3.0445E−02  | 2.0861E−02  | 5.4233E−05  |
| $A_{14}$ | 1.8785E−03  | 2.5295E−03  | 8.4260E−03  | −1.3304E−05 |
| $A_{16}$ | −9.9605E−04 | −1.5677E−03 | −2.7342E−03 | 9.0795E−07  |
| $A_{18}$ | 0.0000E+00  | 0.0000E+00  | 2.8453E−04  | 1.7399E−09  |

Third Embodiment

Figure 3A:
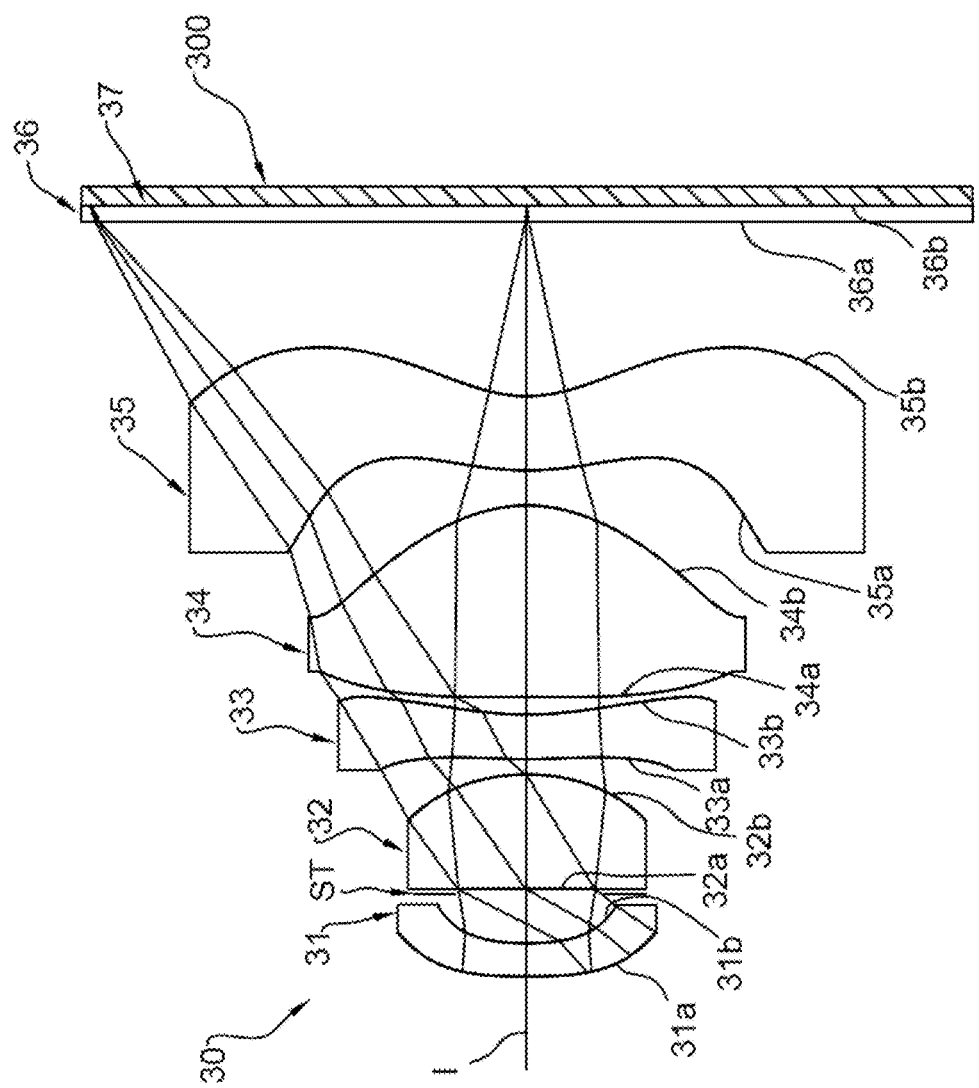
FIG. 3A is a schematic view of an optical imaging lens assembly according to a third embodiment of the present disclosure.
Figure 3D:
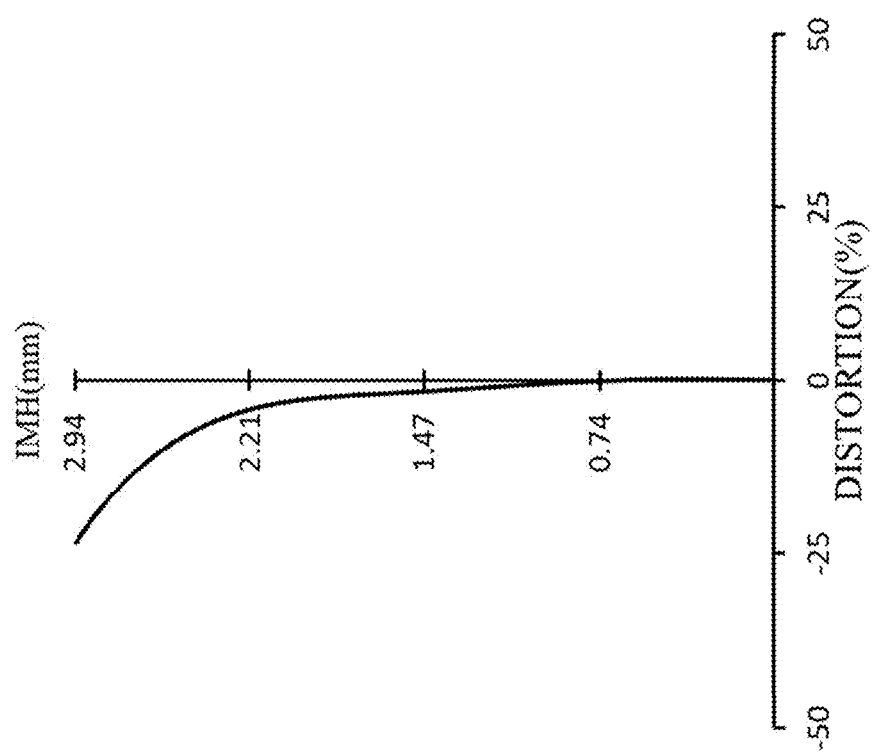
FIG. 3D shows the distortion curves of the optical imaging lens assembly according to the third embodiment.

FIG. 3A is a schematic view of an optical imaging lens assembly of a third embodiment according to the present disclosure. FIG. 3B shows the longitudinal spherical aberration curves of the optical imaging lens assembly according to the third embodiment. FIG. 3C shows the astigmatism field curves of the optical imaging lens assembly according to the third embodiment. FIG. 3D shows the distortion curves of the optical imaging lens assembly according to the third embodiment.

As shown in FIG. 3A, the optical imaging lens assembly 30 of the third embodiment includes, in order from an object side to an image side, a first lens 31, an aperture stop ST, a second lens 32, a third lens 33, a fourth lens 34, a fifth lens 35, a filter unit 36 and an image plane 37. In addition, an electronic image sensor 300 could be disposed on the image plane 37 of the optical imaging lens assembly 30 to form an imaging device (not labeled).

The first lens 31 has negative refractive power and is made of plastic material. The first lens 31 includes an object-side surface 31a being convex and an image-side surface 31b being concave, wherein the object-side surface 31a and the image-side surface 31b are both aspheric.

The second lens 32 has positive refractive power and is made of plastic material. The second lens 32 includes an object-side surface 32a being concave and an image-side surface 32b being convex, wherein the object-side surface 32a and the image-side surface 32b are both aspheric.

The third lens 33 has negative refractive power and is made of plastic material. The third lens 33 includes an object-side surface 33a and an image-side surface 33b which are both aspheric, wherein a paraxial region of the object-side surface 33a is convex, and an off-axis region of the object-side surface 33a is concave; a paraxial region of the image-side surface 33b is concave, and an off-axis region of the image-side surface 33b is convex.

The fourth lens 34 has positive refractive power and is made of plastic material. The fourth lens 34 includes an object-side surface 34a and an image-side surface 34b which are both aspheric, wherein a paraxial region of the image-side surface 34b is convex and an off-axis region of the image-side surface 34b is concave.

The fifth lens 35 has negative refractive power and is made of plastic material. The fifth lens 35 includes an object-side surface 35a and an image-side surface 35b which are both aspheric, wherein a paraxial region of the object-side surface 35a is convex and an off-axis region of the object-side surface 35a is concave; a paraxial region of the image-side surface 35b is concave and an off-axis region of the image-side surface 35b is convex.

The filter unit 36 is placed between the fifth lens 35 and the image plane 37 and is made of glass. Both sides of the filter unit 36 are flat surfaces 36a, 36b. The filter unit 36 could be, for example, an IR-cut filter.

The parameters for the optical imaging lens assembly 30 of the third embodiment have the same abbreviations as those parameters used in the first embodiment, such as f is an effective focal length; Fno is F-number; HFOV is half of the maximum field of view, and so on. The parameters for the optical imaging lens assembly 30 of the third embodiment are listed in Table 6.

TABLE 6

| f (mm) | 2.09 | CT1/(AT1 + CT2) | 0.197 |
|---|---|---|---|
| Fno | 2.4 | $\lvert f2/f \rvert$ | 1.291 |
| TTL (mm) | 5.19 | (AT2 + AT3)/AT4 | 0.941 |
| Image Height (IMH) | 2.934 | TTL/IMH | 1.769 |
| HFOV (degree) | 61.3 | $\lvert f2/f3 \rvert$ | 0.346 |
|  |  | V3/V5 | 0.915 |

Then, referring to the following Table 7 and Table 8, wherein Table 7 shows the optical parameters of the optical imaging lens assembly according to the third embodiment of the present disclosure; Table 8 shows the aspherical surface coefficients for the aspherical lens surfaces in Table 7.

TABLE 7

Third Embodiment
f = 2.09 mm, Fno = 2.4, TTL = 5.19 mm, HFOV = 61.3 degrees, IMH = 2.934 mm

|  | Surface | Curvature (1/mm) |  | Distance (mm) | Refractive Index | Abbe Number | Focal length(mm) | Material |
|---|---|---|---|---|---|---|---|---|
| Object |  | Flat Surface |  | Infinity |  |  |  |  |
| 1st lens | 31a | 0.176 | ASP | 0.224 | 1.54 | 56.100 | −4.916 | Plastic |
|  | 31b | 0.556 | ASP | 0.362 |  |  |  |  |
| Aperture Stop | ST | 0 |  | 0.005 |  |  |  |  |
| $2^{nd}$ lens | 32a | −0.029 | ASP | 0.770 | 1.53 | 55.700 | 2.698 | Plastic |
|  | 32b | −0.714 | ASP | 0.103 |  |  |  |  |
| $3^{rd}$ lens | 33a | 0.250 | ASP | 0.300 | 1.65 | 21.500 | −7.787 | Plastic |
|  | 33b | 0.459 | ASP | 0.119 |  |  |  |  |
| $4^{th}$ lens | 34a | 0.139 | ASP | 1.290 | 1.54 | 56.100 | 1.894 | Plastic |
|  | 34b | −0.991 | ASP | 0.236 |  |  |  |  |
| $5^{th}$ lens | 35a | −0.331 | ASP | 0.500 | 1.64 | 23.500 | −3.265 | Plastic |
|  | 35b | 1.096 | ASP | 0.476 |  |  |  |  |
| Filter Unit | 36a | Flat Surface |  |  | 1.52 | 64.100 |  | Glass |
|  | 36b | Flat Surface |  |  |  |  |  |  |
| Image Plane |  | Flat Surface |  |  |  |  |  |  |

TABLE 8

Third Embodiment__Aspherical Surface Coefficient

| Surface | 31a | 31b | 32a | 32b | 33a | 33b |
|---|---|---|---|---|---|---|
| K | 1.0455E+00 | 7.3552E+00 | −7.9764E+01 | 7.1940E−01 | −7.3694E+01 | −4.7727E+00 |
| $A_2$ | 0.0000E+00 | 0.0000E+00 | 0.0000E+00 | 0.0000E+00 | 0.0000E+00 | 0.0000E+00 |
| $A_4$ | 5.2477E−01 | 7.8045E−01 | 9.5684E−02 | −2.1166E−01 | −3.0863E−01 | −1.8301E−01 |
| $A_6$ | −4.0526E−01 | −1.0052E+00 | −8.6267E−01 | 7.5028E−01 | 5.5755E−01 | 2.0632E−01 |
| $A_8$ | 4.3670E−01 | 3.0559E+00 | 3.4874E+00 | −2.0209E+00 | −8.7289E−01 | −1.6962E−01 |
| $A_{10}$ | −2.5817E−01 | −1.5103E+00 | 2.3972E+00 | 2.9643E+00 | 7.3992E−01 | 7.9871E−02 |
| $A_{12}$ | 1.2552E−01 | −8.3563E+00 | −4.3359E+01 | −2.0279E+00 | −2.4723E−01 | −7.3178E−03 |
| $A_{14}$ | 6.3977E−01 | 2.8745E+01 | 7.4838E+01 | 2.9236E−01 | 2.3932E−02 | −1.1257E−02 |
| $A_{16}$ | −8.2555E−01 | 0.0000E+00 | 0.0000E+00 | 0.0000E+00 | −5.1556E−02 | 2.7328E−03 |
| $A_{18}$ | 0.0000E+00 | 0.0000E+00 | 0.0000E+00 | 0.0000E+00 | 0.0000E+00 | 0.0000E+00 |

| Surface | 34a | 34b | 35a | 35b |
|---|---|---|---|---|
| K | −5.1059E+01 | −1.3672E+00 | −1.0785E+00 | −2.8675E+00 |
| $A_2$ | −9.2259E−02 | 0.0000E+00 | 4.2139E−01 | 0.0000E+00 |
| $A_4$ | 1.8051E−01 | 9.9409E−02 | −1.7062E−01 | −1.7007E−01 |
| $A_6$ | −2.1125E−01 | −1.9897E−01 | −7.8486E−02 | 7.9658E−02 |
| $A_8$ | 1.9298E−01 | 2.0731E−01 | 1.0826E−01 | −2.6698E−02 |
| $A_{10}$ | −9.7467E−02 | −1.2269E−01 | −5.8093E−02 | 5.8635E−03 |
| $A_{12}$ | 1.9658E−02 | 3.1330E−02 | 1.1319E−02 | −8.2281E−04 |
| $A_{14}$ | 2.4297E−03 | 2.6599E−03 | −2.5031E−04 | 6.5407E−05 |
| $A_{16}$ | −1.2028E−03 | −1.6956E−03 | −1.3877E−05 | −2.1333E−06 |
| $A_{18}$ | 0.0000E+00 | 0.0000E+00 | 0.0000E+00 | 0.0000E+00 |

Fourth Embodiment

Figure 4A:
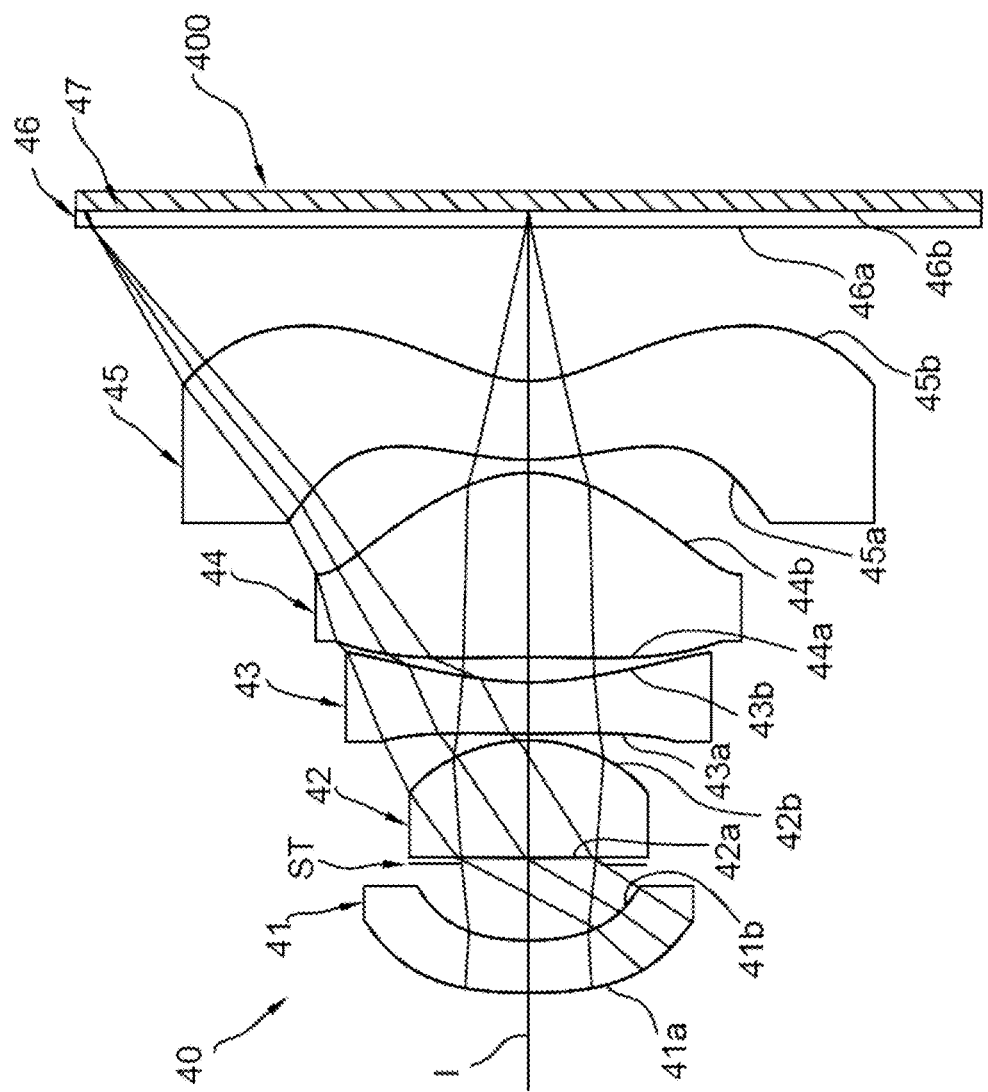
FIG. 4A is a schematic view of an optical imaging lens assembly according to a fourth embodiment of the present disclosure.
Figures 4B, 4C:
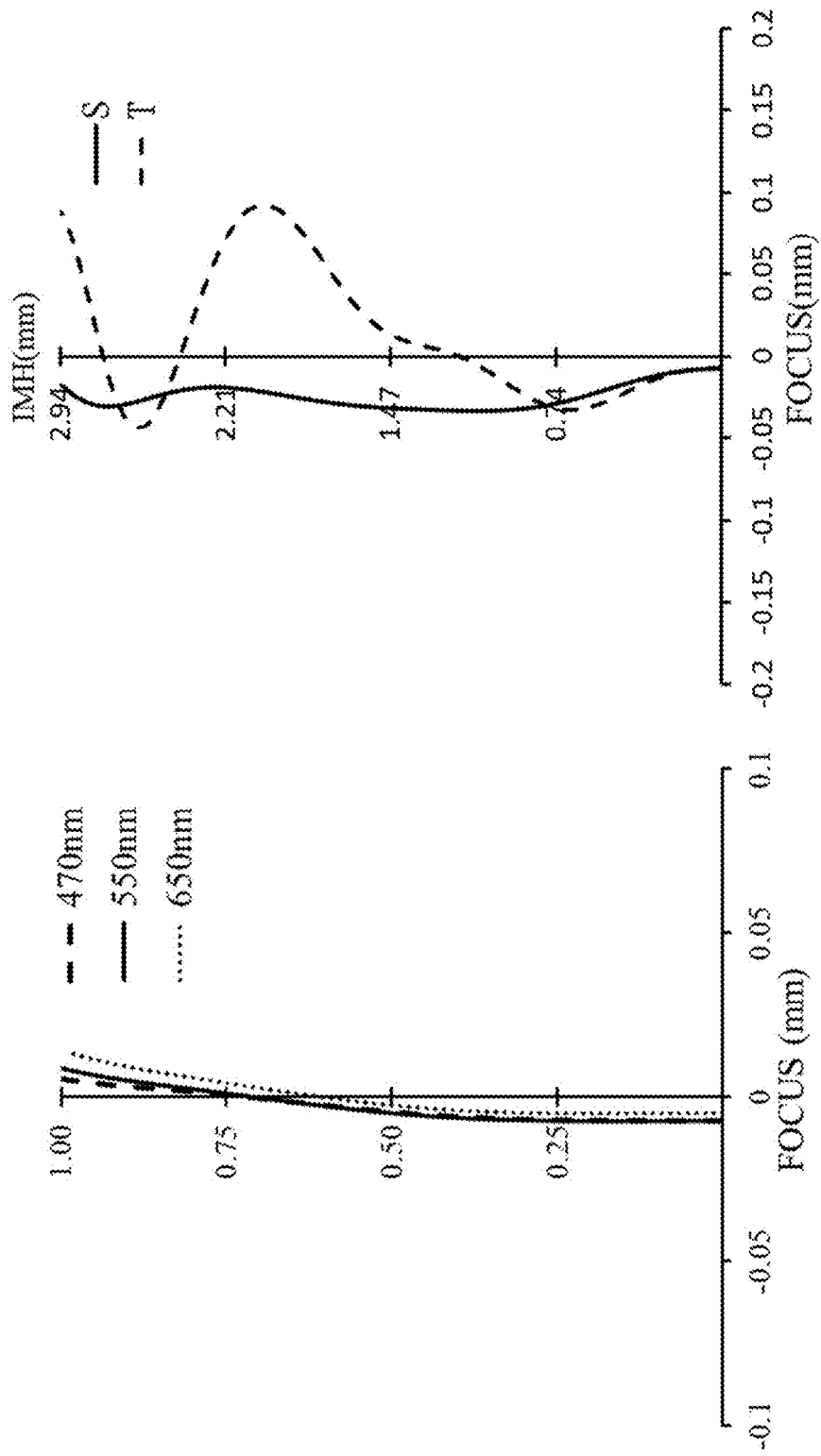
FIG. 4B shows the longitudinal spherical aberration curves of the optical imaging lens assembly according to the fourth embodiment.
FIG. 4C shows the astigmatism field curves of the optical imaging lens assembly according to the fourth embodiment.
Figure 4D:
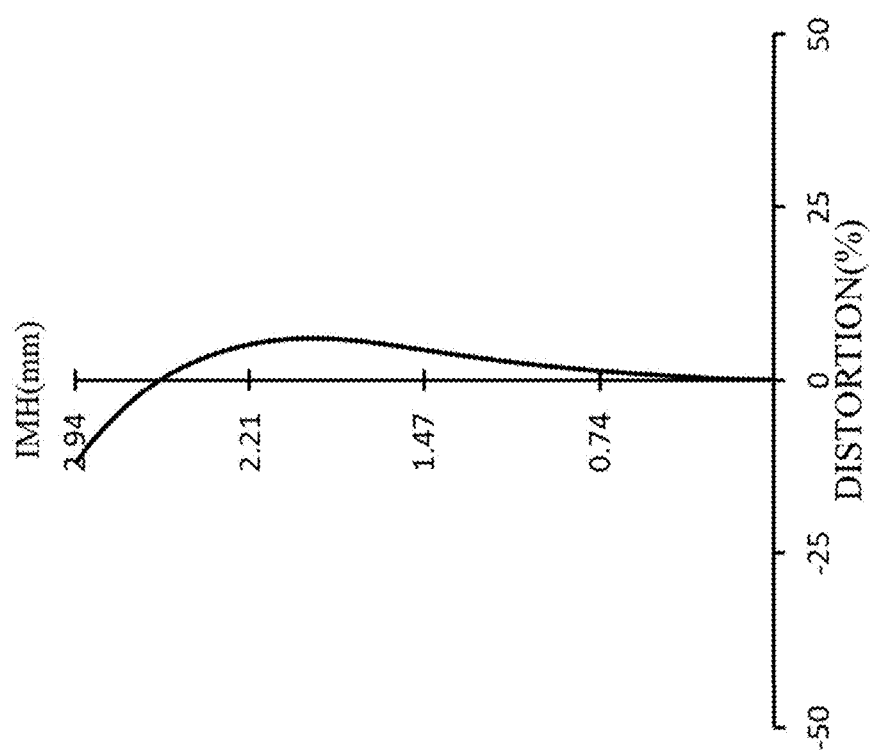
FIG. 4D shows the distortion curves of the optical imaging lens assembly according to the fourth embodiment.

FIG. 4A is a schematic view of an optical imaging lens assembly of a fourth embodiment according to the present disclosure. FIG. 4B shows the longitudinal spherical aberration curves of the optical imaging lens assembly according to the fourth embodiment. FIG. 4C shows the astigmatism field curves of the optical imaging lens assembly according to the fourth embodiment. FIG. 4D shows the distortion curves of the optical imaging lens assembly according to the fourth embodiment.

As shown in FIG. 4A, the optical imaging lens assembly 40 of the fourth embodiment includes, in order from an object side to an image side, a first lens 41, an aperture stop ST, a second lens 42, a third lens 43, a fourth lens 44, a fifth lens 45, a filter unit 46 and an image plane 47. In addition, an electronic image sensor 400 could be disposed on the image plane 47 of the optical imaging lens assembly 40 to form an imaging device (not labeled).

The first lens 41 has negative refractive power and is made of plastic material. The first lens 41 includes an object-side surface 41a being convex and an image-side surface 41b being concave, wherein the object-side surface 41a and the image-side surface 41b are both aspheric.

The second lens 42 has positive refractive power and is made of plastic material. The second lens 42 includes an object-side surface 42a being concave and an image-side surface 42b being convex, wherein the object-side surface 42a and the image-side surface 42b are both aspheric.

The third lens 43 has negative refractive power and is made of plastic material. The third lens 43 includes an object-side surface 43a and an image-side surface 43b which are both aspheric, wherein a paraxial region of the object-side surface 43a is convex, and an off-axis region of the object-side surface 43a is concave; the image-side surface 43b is concave.

The fourth lens 44 has positive refractive power and is made of plastic material. The fourth lens 44 includes an object-side surface 44a and an image-side surface 44b which are both aspheric, wherein the image-side surface 44b is convex.

The fifth lens 45 has negative refractive power and is made of plastic material. The fifth lens 45 includes an object-side surface 45a and an image-side surface 45b which are both aspheric, wherein a paraxial region of the object-side surface 45a is convex and an off-axis region of the object-side surface 45a is concave; a paraxial region of the image-side surface 45b is concave and an off-axis region of the image-side surface 45b is convex.

The filter unit 46 is placed between the fifth lens 45 and the image plane 47 and is made of glass. Both sides of the filter unit 46 are flat surfaces 46a, 46b. For example, the filter unit 46 could be, for example, an IR-cut filter.

The parameters for the optical imaging lens assembly 40 of the fourth embodiment have the same abbreviations as those parameters used in the first embodiment, such as f is an effective focal length; Fno is F-number; HFOV is half of the maximum field of view, and so on. The parameters for the optical imaging lens assembly 40 of the fourth embodiment are listed in Table 9.

TABLE 9

| f (mm) | 2 | CT1/(AT1 + CT2) | 0.261 |
|---|---|---|---|
| Fno | 2.4 | |f2/f| | 0.948 |
| TTL (mm) | 5.18 | (AT2 + AT3)/AT4 | 2.401 |
| Image Height (IMH) | 2.934 | TTL/IMH | 1.766 |
| HFOV (degree) | 58.8 | |f2/f3| | 0.477 |
|  |  | V3/V5 | 1.000 |

Then, referring to the following Table 10 and Table 11, wherein Table 10 shows the optical parameters of the optical imaging lens assembly according to the fourth embodiment of the present disclosure; Table 11 shows the aspherical surface coefficients for the aspherical lens surfaces in Table 10.

TABLE 10

Fourth Embodiment
f = 2 mm, Fno = 2.4, TTL = 5.18 mm, HFOV = 58.8 degrees, IMH = 2.934 mm

| | Surface | Curvature (1/mm) | | Distance (mm) | Refractive Index | Abbe Number | Focal length(mm) | Material |
|---|---|---|---|---|---|---|---|---|
| Object | | Flat Surface | | Infinity | | | | |
| 1st lens | 41a | 0.243 | ASP | 0.347 | 1.544 | 56.100 | −5.561 | Plastic |
| | 41b | 0.590 | ASP | 0.535 | | | | |
| Aperture Stop | ST | 0 | | 0.011 | | | | |
| 2$^{nd}$ lens | 42a | −0.048 | ASP | 0.779 | 1.54 | 56.100 | 1.896 | Plastic |
| | 42b | −0.912 | ASP | 0.044 | | | | |
| 3$^{rd}$ lens | 43a | 0.110 | ASP | 0.341 | 1.64 | 23.500 | −3.971 | Plastic |
| | 43b | 0.508 | ASP | 0.166 | | | | |
| 4$^{th}$ lens | 44a | 0.165 | ASP | 1.222 | 1.54 | 56.100 | 1.755 | Plastic |
| | 44b | −1.105 | ASP | 0.088 | | | | |
| 5$^{th}$ lens | 45a | 0.537 | ASP | 0.521 | 1.64 | 23.500 | −2.582 | Plastic |
| | 45b | 1.715 | ASP | 0.538 | | | | |
| Filter Unit | 46a | Flat Surface | | | 1.52 | 64.100 | | Glass |
| | 46b | Flat Surface | | | | | | |
| Image Plane | | Flat Surface | | | | | | |

TABLE 11

Fourth Embodiment—Aspherical Surface Coefficient

| Surface | 41a | 41b | 42a | 42b | 43a | 43b |
|---|---|---|---|---|---|---|
| K | 2.7405E+00 | 9.1360E−01 | 2.7810E+01 | −1.1162E+00 | 1.8248E+01 | −1.1127E+00 |
| $A_2$ | 0.0000E+00 | 0.0000E+00 | 5.9482E−02 | 0.0000E+00 | 0.0000E+00 | 0.0000E+00 |
| $A_4$ | 3.6776E−01 | 5.4641E−01 | −5.5270E−02 | −1.0706E−01 | −2.9154E−01 | −2.1983E−01 |
| $A_6$ | −6.7485E−01 | −5.3344E−01 | −7.6430E−01 | 9.9002E−02 | 6.4289E−01 | 2.5142E−01 |
| $A_8$ | 1.8534E+00 | 3.0100E+00 | 3.8720E+00 | 1.9481E−01 | −1.0938E+00 | −1.8946E−01 |
| $A_{10}$ | −3.3498E+00 | −9.1466E+00 | −1.1393E+01 | −2.7033E+00 | 1.0526E+00 | 7.6562E−02 |
| $A_{12}$ | 3.6402E+00 | 1.8023E+01 | 1.0095E+01 | 5.0007E+00 | −4.7280E−01 | −1.0254E−02 |
| $A_{14}$ | −2.0701E+00 | −1.3586E+01 | 0.0000E+00 | −3.3526E+00 | −2.1522E−02 | −2.1921E−03 |
| $A_{16}$ | 4.6679E−01 | 0.0000E+00 | 0.0000E+00 | 0.0000E+00 | 6.6473E−02 | −1.4200E−06 |
| $A_{18}$ | 0.0000E+00 | 0.0000E+00 | 0.0000E+00 | 0.0000E+00 | 0.0000E+00 | 0.0000E+00 |

| Surface | 44a | 44b | 45a | 45b |
|---|---|---|---|---|
| K | −1.0000E−02 | −1.9613E+00 | −1.0270E+01 | −2.3029E+00 |
| $A_2$ | −1.4184E−01 | 0.0000E+00 | 4.3762E−03 | −2.1253E−01 |
| $A_4$ | 1.9258E−01 | 6.5312E−02 | −8.4626E−02 | −3.6818E−02 |
| $A_6$ | −2.3947E−01 | −1.7528E−01 | −9.4720E−02 | 1.7211E−02 |
| $A_8$ | 2.2746E−01 | 2.1847E−01 | 1.1944E−01 | −6.1549E−03 |
| $A_{10}$ | −1.1237E−01 | −1.4698E−01 | −6.6126E−02 | 1.0081E−03 |
| $A_{12}$ | 1.7253E−02 | 4.5312E−02 | 3.9053E−03 | −2.3777E−05 |
| $A_{14}$ | 7.0327E−03 | −9.6477E−05 | 1.0417E−02 | −1.7545E−05 |
| $A_{16}$ | −2.5137E−03 | −1.6828E−03 | −3.9474E−03 | 2.2828E−06 |
| $A_{18}$ | 0.0000E+00 | 0.0000E+00 | 4.5902E−04 | −7.7182E−08 |

Fifth Embodiment

Figure 5A:
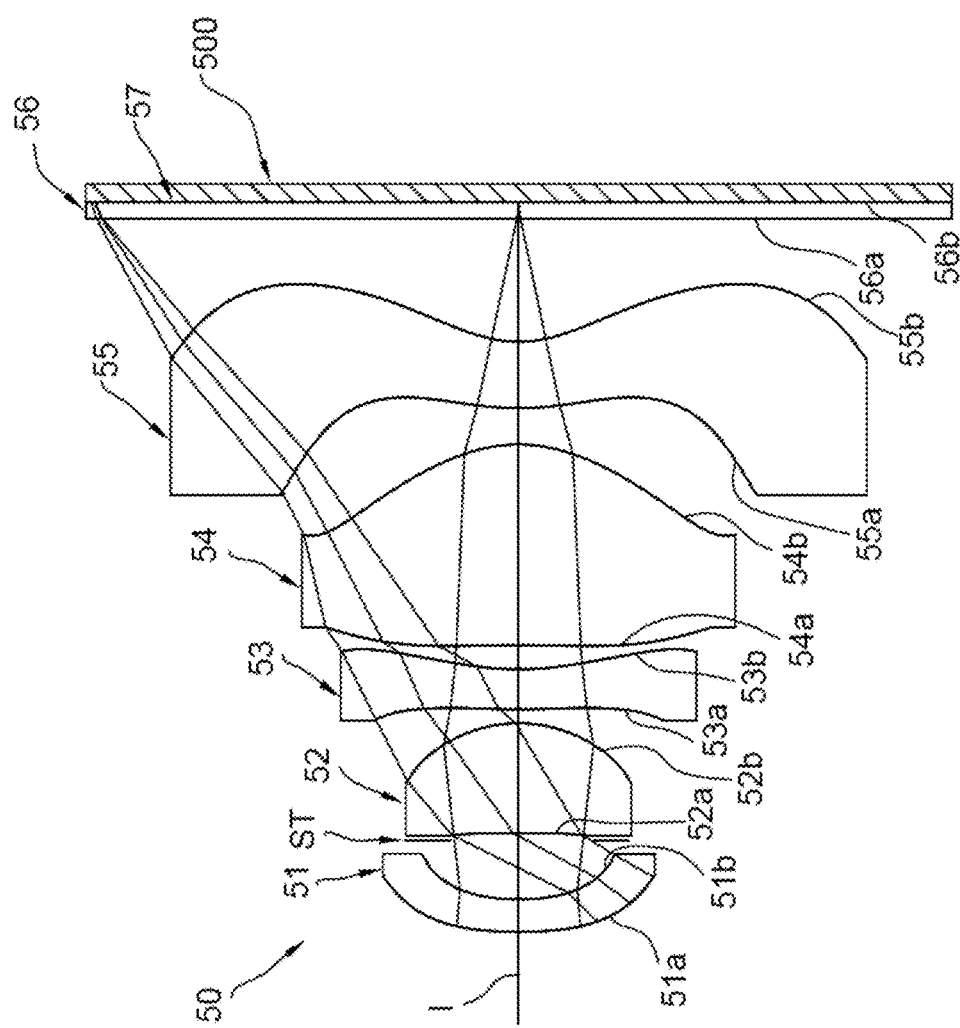
FIG. 5A is a schematic view of an optical imaging lens assembly according to a fifth embodiment of the present disclosure.

FIG. 5A is a schematic view of an optical imaging lens assembly of a fifth embodiment according to the present disclosure. FIG. 5B shows the longitudinal spherical aberration curves of the optical imaging lens assembly according to the fifth embodiment. FIG. 5C shows the astigmatism field curves of the optical imaging lens assembly according to the fifth embodiment. FIG. 5D shows the distortion curves of the optical imaging lens assembly according to the fifth embodiment.

As shown in FIG. 5A, the optical imaging lens assembly 50 of the fifth embodiment includes, in order from an object side to an image side, a first lens 51, an aperture stop ST, a second lens 52, a third lens 53, a fourth lens 54, a fifth lens 55, a filter unit 56 and an image plane 57. In addition, an electronic image sensor 500 could be disposed on the image plane 57 of the optical imaging lens assembly 50 to form an imaging device (not labeled).

The first lens 51 has negative refractive power and is made of plastic material. The first lens 51 includes an object-side surface 51a being convex and an image-side surface 51b being concave, wherein the object-side surface 51a and the image-side surface 51b are both aspheric.

The second lens 52 has positive refractive power and is made of plastic material. The second lens 52 includes an object-side surface 52a being concave and an image-side surface 52b being convex, wherein the object-side surface 52a and the image-side surface 52b are both aspheric.

The third lens 53 has negative refractive power and is made of plastic material. The third lens 53 includes an object-side surface 53a and an image-side surface 53b which are both aspheric, wherein a paraxial region of the object-side surface 53a is convex, and an off-axis region of the object-side surface 53a is concave; the image-side surface 53b is concave.

The fourth lens 54 has positive refractive power and is made of plastic material. The fourth lens 54 includes an object-side surface 54a and an image-side surface 54b which are both aspheric, wherein the image-side surface 54b is convex.

The fifth lens 55 has negative refractive power and is made of plastic material. The fifth lens 55 includes an object-side surface 55a and an image-side surface 55b which are both aspheric, wherein a paraxial region of the object-side surface 55a is convex and an off-axis region of the object-side surface 55a is concave; a paraxial region of the image-side surface 55b is concave and an off-axis region of the image-side surface 55b is convex.

The filter unit 56 is placed between the fifth lens 55 and the image plane 57 and is made of glass. Both sides of the filter unit 56 are flat surfaces 56a, 56b. The filter unit 56 could be, for example, an IR-cut filter.

The parameters for the optical imaging lens assembly 50 of the fifth embodiment have the same abbreviations as those parameters used in the first embodiment, such as f is an effective focal length; Fno is F-number; HFOV is half of the maximum field of view, and so on. The parameters for the optical imaging lens assembly 50 of the fifth embodiment are listed in Table 12.

TABLE 12

| f (mm) | 2.1 | CT1/(AT1 + CT2) | 0.184 |
|---|---|---|---|
| Fno | 2.3 | |f2/f| | 0.878 |
| TTL (mm) | 5.06 | (AT2 + AT3)/AT4 | 1.053 |
| Image Height (IMH) | 2.934 | TTL/IMH | 1.725 |
| HFOV (degree) | 61.65 | |f2/f3| | 0.401 |
| | | V3/V5 | 0.788 |

Then, referring to the following Table 13 and Table 14, wherein Table 13 shows the optical parameters of the optical imaging lens assembly according to the fifth embodiment of the present disclosure; Table 14 shows the aspherical surface coefficients for the aspherical lens surfaces in Table 13.

TABLE 13

Fifth Embodiment
f = 2.1 mm, Fno = 2.3, TTL = 5.06 mm, HFOV = 61.65 degrees, IMH = 2.934 mm

|  | Surface | Curvature (1/mm) | | Distance (mm) | Refractive Index | Abbe Number | Focal length(mm) | Material |
|---|---|---|---|---|---|---|---|---|
| Object |  | Flat Surface |  | Infinity |  |  |  |  |
| 1st lens | 51a | 0.291 | ASP | 0.225 | 1.54 | 56.100 | −5.855 | Plastic |
|  | 51b | 0.618 | ASP | 0.439 |  |  |  |  |
| Aperture Stop | ST | 0 |  | 0.020 |  |  |  |  |
| 2$^{nd}$ lens | 52a | −0.049 | ASP | 0.763 | 1.54 | 56.100 | 1.843 | Plastic |
|  | 52b | −1.029 | ASP | 0.097 |  |  |  |  |
| 3$^{rd}$ lens | 53a | 0.195 | ASP | 0.277 | 1.66 | 20.400 | −4.597 | Plastic |
|  | 53b | 0.533 | ASP | 0.169 |  |  |  |  |
| 4$^{th}$ lens | 54a | 0.081 | ASP | 1.391 | 1.54 | 56.100 | 2.000 | Plastic |
|  | 54b | −0.987 | ASP | 0.252 |  |  |  |  |
| 5$^{th}$ lens | 55a | −0.315 | ASP | 0.460 | 1.62 | 25.900 | −2.571 | Plastic |
|  | 55b | 1.232 | ASP | 0.966 |  |  |  |  |
| Filter Unit | 56a | Flat Surface |  |  | 1.52 | 64.100 |  | Glass |
|  | 56b | Flat Surface |  |  |  |  |  |  |
| Image Plane |  | Flat Surface |  |  |  |  |  |  |

TABLE 14

Fifth Embodiment_Aspherical Surface Coefficient

| Surface | 51a | 51b | 52a | 52b | 53a | 53b |
|---|---|---|---|---|---|---|
| K | 1.1186E+01 | 3.5138E+00 | 1.0000E+02 | −1.8680E−01 | −6.0819E+01 | −5.9071E+00 |
| $A_2$ | 0.0000E+00 | 0.0000E+00 | 0.0000E+00 | 0.0000E+00 | 0.0000E+00 | 0.0000E+00 |
| $A_4$ | 3.4091E−01 | 5.3553E−01 | −1.0086E−01 | −8.3592E−02 | −2.9240E−01 | −1.6790E−01 |
| $A_6$ | −3.0264E−01 | −5.4523E−01 | −5.2416E−01 | 6.1886E−01 | 5.3610E−01 | 2.1513E−01 |
| $A_8$ | 3.8322E−01 | 1.1209E+00 | 1.3165E+00 | −2.1336E+00 | −8.2326E−01 | −1.8038E−01 |
| $A_{10}$ | −2.5972E−01 | 4.2314E+00 | 2.5936E+00 | 3.0182E+00 | 7.1467E−01 | 7.2385E−02 |
| $A_{12}$ | 8.0604E−02 | −1.6767E+01 | −3.7890E+01 | −2.3858E+00 | −3.0043E−01 | −5.9370E−03 |
| $A_{14}$ | 1.0943E−01 | 2.0562E+01 | 6.2764E+01 | 7.1151E−01 | −4.8122E−02 | −9.2347E−03 |
| $A_{16}$ | −1.1446E−01 | 5.0657E+00 | 5.7095E+00 | −8.4684E−01 | 6.7513E−02 | 2.8920E−03 |
| $A_{18}$ | 0.0000E+00 | 0.0000E+00 | 0.0000E+00 | 0.0000E+00 | 0.0000E+00 | 0.0000E+00 |

| Surface | 54a | 54b | 55a | 55b |
|---|---|---|---|---|
| K | 5.8674E+01 | −1.6598E+00 | 1.8780E−01 | −2.8453E+00 |
| $A_2$ | −1.1027E−01 | 0.0000E+00 | 4.0549E−01 | 0.0000E+00 |
| $A_4$ | 2.0408E−01 | 1.0461E−01 | −1.9649E−01 | −1.6164E−01 |
| $A_6$ | −2.1549E−01 | −1.9571E−01 | −5.4223E−02 | 8.0118E−02 |
| $A_8$ | 1.8827E−01 | 2.1188E−01 | 1.0274E−01 | −2.6987E−02 |
| $A_{10}$ | −9.9277E−02 | −1.2227E−01 | −5.7949E−02 | 5.8325E−03 |
| $A_{12}$ | 2.0884E−02 | 3.0086E−02 | 1.2008E−02 | −8.1943E−04 |
| $A_{14}$ | 2.9610E−03 | 2.2833E−03 | −1.5448E−04 | 6.6859E−05 |
| $A_{16}$ | −1.5271E−03 | −1.5385E−03 | −1.2701E−04 | −2.3530E−06 |
| $A_{18}$ | 0.0000E+00 | 0.0000E+00 | 0.0000E+00 | 0.0000E+00 |

Sixth Embodiment

Figure 6A:
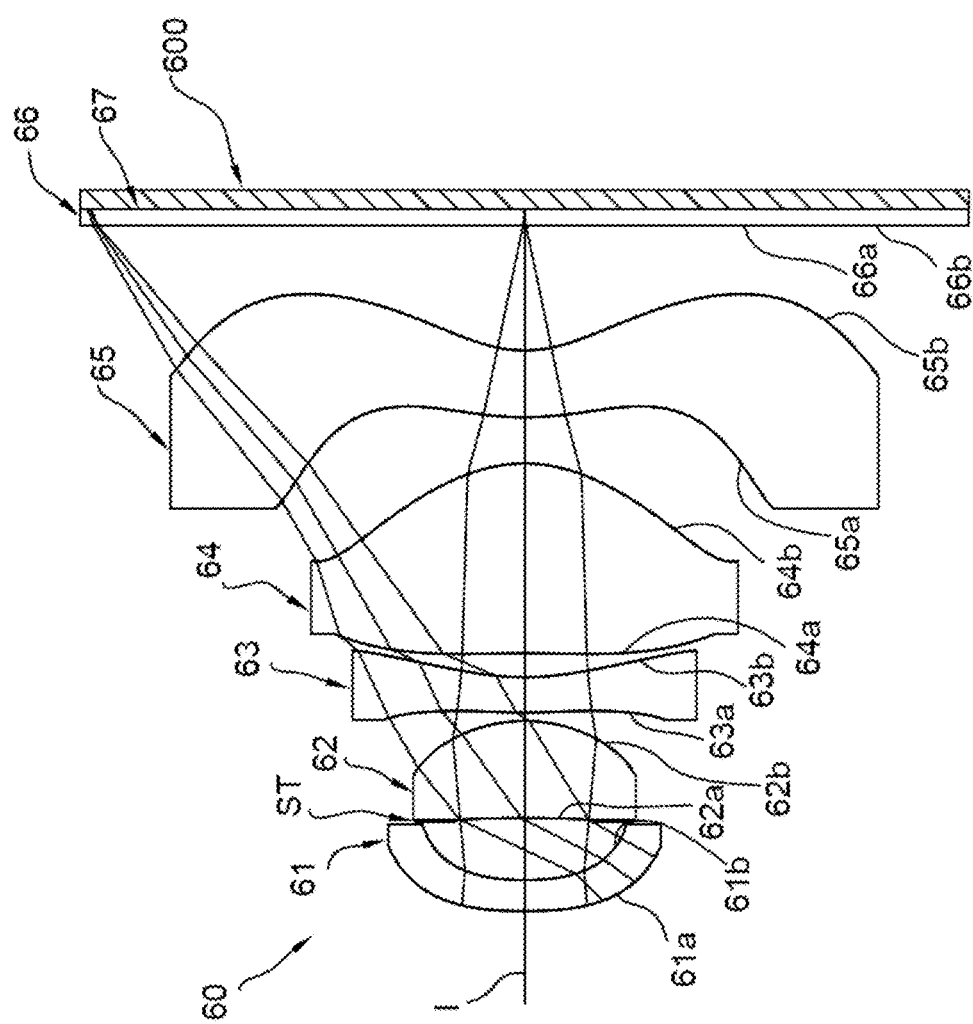
FIG. 6A is a schematic view of an optical imaging lens assembly according to a sixth embodiment of the present disclosure.
Figure 6D:
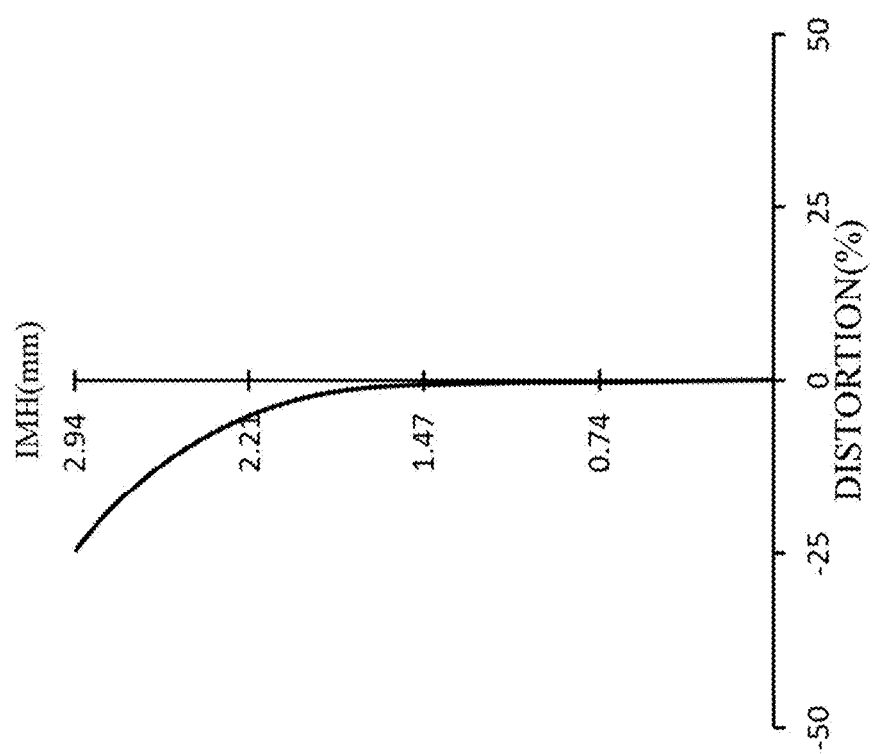
FIG. 6D shows the distortion curves of the optical imaging lens assembly according to the sixth embodiment.

FIG. 6A is a schematic view of an optical imaging lens assembly of a sixth embodiment according to the present disclosure. FIG. 6B shows the longitudinal spherical aberration curves of the optical imaging lens assembly according to the sixth embodiment. FIG. 6C shows the astigmatism field curves of the optical imaging lens assembly according to the sixth embodiment. FIG. 6D shows the distortion curves of the optical imaging lens assembly according to the sixth embodiment.

As shown in FIG. 6A, the optical imaging lens assembly 60 of the sixth embodiment includes, in order from an object side to an image side, a first lens 61, an aperture stop ST, a second lens 62, a third lens 63, a fourth lens 64, a fifth lens 65, a filter unit 66 and an image plane 67. In addition, an electronic image sensor 600 could be disposed on the image plane 67 of the optical imaging lens assembly 60 to form an imaging device (not labeled).

The first lens 61 has negative refractive power and is made of plastic material. The first lens 61 includes an object-side surface 61a being convex and an image-side surface 61b being concave, wherein the object-side surface 61a and the image-side surface 61b are both aspheric.

The second lens 62 has positive refractive power and is made of plastic material. The second lens 62 includes an object-side surface 62a being concave and an image-side surface 62b being convex, wherein the object-side surface 62a and the image-side surface 62b are both aspheric.

The third lens 63 has negative refractive power and is made of plastic material. The third lens 63 includes an object-side surface 63a and an image-side surface 63b which are both aspheric, wherein a paraxial region of the object-side surface 63a is convex, and an off-axis region of the object-side surface 63a is concave; the image-side surface 63b is concave.

The fourth lens 64 has positive refractive power and is made of plastic material. The fourth lens 64 includes an object-side surface 64a and an image-side surface 64b which are both aspheric, wherein the image-side surface 64b is convex.

The fifth lens 65 has negative refractive power and is made of plastic material. The fifth lens 65 includes an object-side surface 65a and an image-side surface 65b which are both aspheric, wherein a paraxial region of the object-side surface 65a is convex and an off-axis region of the object-side surface 65a is concave; a paraxial region of the image-side surface 65b is concave and an off-axis region of the image-side surface 65b is convex.

The filter unit 66 is placed between the fifth lens 65 and the image plane 67 and is made of glass. Both sides of the filter unit 66 are flat surfaces 66a, 66b. The filter unit 66 could be, for example, an IR-cut filter.

The parameters for the optical imaging lens assembly 60 of the sixth embodiment have the same abbreviations as those parameters used in the first embodiment, such as f is an effective focal length; Fno is F-number; HFOV is half of the maximum field of view, and so on. The parameters for the optical imaging lens assembly 60 of the sixth embodiment are listed in Table 15.

TABLE 15

| f (mm) | 2.095 | CT1/(AT1 + CT2) | 0.195 |
|---|---|---|---|
| Fno | 2.45 | |f2/f| | 0.937 |
| TTL (mm) | 4.74 | (AT2 + AT3)/AT4 | 0.710 |
| Image Height (IMH) | 2.934 | TTL/IMH | 1.616 |
| HFOV (degree) | 61.7 | |f2/f3| | 0.454 |
| | | V3/V5 | 1.093 |

Then, referring to the following Table 16 and Table 17, wherein Table 16 shows the optical parameters of the optical imaging lens assembly according to the sixth embodiment of the present disclosure; Table 17 shows the aspherical surface coefficients for the aspherical lens surfaces in Table 16.

TABLE 16

Sixth Embodiment
f = 2.095 nm, Fno = 2.45, TTL = 4.74 mm, HFOV = 61.7 degrees, IMH = 2.934 mm

| | Surface | Curvature (1/mm) | | Distance (mm) | Refractive Index | Abbe Number | Focal length(mm) | Material |
|---|---|---|---|---|---|---|---|---|
| Object | | Flat Surface | | Infinite | | | | |
| 1st lens | 61a | 0.308 | ASP | 0.210 | 1.54 | 56.100 | −7.311 | Plastic |
| | 61b | 0.572 | ASP | 0.407 | | | | |
| Aperture Stop | ST | 0 | | 0.010 | | | | |
| $2^{nd}$ lens | 62a | −0.035 | ASP | 0.657 | 1.54 | 56.100 | 1.964 | Plastic |
| | 62b | −0.962 | ASP | 0.058 | | | | |
| $3^{rd}$ lens | 63a | 0.204 | ASP | 0.237 | 1.64 | 23.500 | −4.329 | Plastic |
| | 63b | 0.576 | ASP | 0.163 | | | | |
| $4^{th}$ lens | 64a | 0.083 | ASP | 1.282 | 1.54 | 56.100 | 1.882 | Plastic |
| | 64b | −1.042 | ASP | 0.312 | | | | |
| $5^{th}$ lens | 65a | −0.336 | ASP | 0.451 | 1.65 | 21.500 | −2.445 | Plastic |
| | 65b | 1.229 | ASP | 0.955 | | | | |
| Filter Unit | 66a | Flat Surface | | | 1.52 | 64.100 | | Glass |
| | 66b | Flat Surface | | | | | | |
| Image Plane | | Flat Surface | | | | | | |

TABLE 17

Sixth Embodiment__Aspherical Surface Coefficient

| Surface | 61a | 61b | 62a | 62b | 63a | 63b |
|---|---|---|---|---|---|---|
| K | 1.1034E+01 | 4.0519E+00 | 9.0000E+01 | −1.3270E−01 | −5.9928E+01 | −5.7632E+00 |
| $A_2$ | 0.0000E+00 | 0.0000E+00 | 0.0000E+00 | 0.0000E+00 | 0.0000E+00 | 0.0000E+00 |
| $A_4$ | 3.5580E−01 | 5.5744E−01 | −1.0052E−01 | −7.6172E−02 | −3.0210E−01 | −1.6604E−01 |
| $A_6$ | −2.5735E−01 | −4.6239E−01 | −5.2074E−01 | 5.2955E−01 | 5.3498E−01 | 2.1788E−01 |
| $A_8$ | 3.6836E−01 | 1.3453E+00 | 1.2089E+00 | −2.2004E+00 | −8.2089E−01 | −1.7752E−01 |
| $A_{10}$ | −2.7519E−01 | 4.0945E+00 | 2.5936E+00 | 3.1013E+00 | 7.4193E−01 | 7.7595E−02 |
| $A_{12}$ | 1.0080E−01 | −1.8528E+01 | −3.9303E+01 | −2.4716E+00 | −2.9550E−01 | −5.6705E−03 |
| $A_{14}$ | 3.0016E−01 | 2.2759E+01 | 7.4084E+01 | 1.2996E+00 | −5.0351E−02 | −1.0223E−02 |
| $A_{16}$ | −2.9621E−01 | 1.2750E+01 | 0.0000E+00 | −2.5507E+00 | 4.9479E−02 | 2.3207E−03 |
| $A_{18}$ | 0.0000E+00 | 0.0000E+00 | 0.0000E+00 | 0.0000E+00 | 0.0000E+00 | 0.0000E+00 |

| Surface | 64a | 64b | 65a | 65b |
|---|---|---|---|---|
| K | 5.7008E+01 | −1.5864E+00 | 3.7370E−01 | −2.8930E+00 |
| $A_2$ | −1.0378E−01 | 0.0000E+00 | 4.1452E−01 | 0.0000E+00 |
| $A_4$ | 2.0865E−01 | 9.7808E−02 | −1.8968E−01 | −1.6176E−01 |
| $A_6$ | −2.2067E−01 | −1.9877E−01 | −5.9052E−02 | 7.8787E−02 |
| $A_8$ | 1.8696E−01 | 2.1197E−01 | 1.0306E−01 | −2.6818E−02 |
| $A_{10}$ | −9.6589E−02 | −1.2133E−01 | −5.7856E−02 | 5.8329E−03 |
| $A_{12}$ | 2.1755E−02 | 3.1136E−02 | 1.2090E−02 | −8.2274E−04 |
| $A_{14}$ | 2.9351E−03 | 2.3708E−03 | −1.3227E−04 | 6.6875E−05 |
| $A_{16}$ | −1.8872E−03 | −1.7064E−03 | −1.2504E−04 | −2.2508E−06 |
| $A_{18}$ | 0.0000E+00 | 0.0000E+00 | 0.0000E+00 | 0.0000E+00 |

Seventh Embodiment

An imaging device of a seventh embodiment includes an optical imaging lens assembly according to the present disclosure and an electronic image sensor. The electronic image sensor could be a CCD (Charge-Coupled Device) or a CMOS (Complementary Metal-Oxide-Semiconductor) sensor, etc. The imaging device could be a portable electronic photographing device or a monitor camera.

Eighth Embodiment

An electronic device of an eighth embodiment includes an imaging device with an optical imaging lens assembly according to the present disclosure. The electronic device could be a portable electronic device, such as a smartphone, a tablet, or an electronic surveillance system, a vehicle monitoring system, etc.

The present disclosure has been described above with some embodiments mentioned above. However, the present disclosure is not limited to the embodiments, but various modifications can be made. In addition, various other substitutions and modifications will occur to those skilled in the art. Therefore, all such substitutions and modifications are intended to be embraced within the scope of the present disclosure as defined in the appended claims.

What is claimed is:

1. An optical imaging lens assembly, in order from an object side to an image side, comprising:
   a first lens with negative refractive power having an object-side surface being convex and an image-side surface being concave;
   an aperture stop;
   a second lens with positive refractive power having an object-side surface being concave and an image-side surface being convex;
   a third lens with negative refractive power having an object-side surface being convex and an image-side surface being concave;
   a fourth lens with positive refractive power having an object-side surface and an image-side surface, wherein the image-side surface of the fourth lens is convex; and
   a fifth lens with negative refractive power having an object-side surface and an image-side surface, wherein a paraxial region of the image-side surface of the fifth lens is concave and an off-axis region of the image-side surface of the fifth lens is convex; the following conditions are satisfied:

$0.1 < CT1/(AT1+CT2) < 0.3$; and $0.8 < |f2/f| < 1.4$;

wherein, CT1 is a thickness of the first lens along an optical axis; CT2 is a thickness of the second lens along the optical axis; AT1 is a distance between the image-side surface of the first lens and the object-side surface of the second lens along the optical axis;
   f is an effective focal length of the optical imaging lens assembly;
   f2 is a focal length of the second lens.

2. The optical imaging lens assembly of claim 1, wherein a distance between the image-side surface of the second lens and the object-side surface of the third lens along the optical axis is AT2; a distance between the image-side surface of the third lens and the object-side surface of the fourth lens along the optical axis is AT3; a distance between the image-side surface of the fourth lens and the object-side surface of the fifth lens along the optical axis is AT4; the following condition is satisfied:

$0.6 < (AT2+AT3)/AT4 < 2.8$.

3. The optical imaging lens assembly of claim 1, wherein a total track length of the optical imaging lens assembly is TTL; a maximum image height of the optical imaging lens assembly is IMH; the following condition is satisfied:

$1.3 < TTL/IMH < 1.9$.

4. The optical imaging lens assembly of claim 1, wherein a focal length of the third lens is f3 and the relation between the focal length of the second lens and the focal length of the third lens satisfies the following condition:

$0.25 < |f2/f3| < 0.6$.

5. The optical imaging lens assembly of claim 1, wherein the Abbe number of the third lens is V3 and the Abbe number of the fifth lens is V5; the following condition is satisfied:

$0.7 < V3/V5 < 1.2$.

6. The optical imaging lens assembly of claim 1, wherein half of the maximum field of view is HFOV and the following condition is satisfied:

$45 \text{ degrees} < HFOV < 70 \text{ degrees}$.

7. The optical imaging lens assembly of claim 1, wherein a paraxial region of the object-side surface of the third lens is convex, and an off-axis region of the object-side surface of the third lens is concave.

8. The optical imaging lens assembly of claim 1, wherein the object-side surface of the fifth lens is convex.

9. An imaging device, comprising:
   the optical imaging lens assembly of claim 1; and
   an electronic image sensor.

10. An electronic device, comprising:
    the imaging device of claim 9.

* * * * *